US012739626B2

(12) United States Patent
Staufer et al.

(10) Patent No.: US 12,739,626 B2
(45) Date of Patent: Sep. 15, 2026

(54) METHOD, APPARATUS AND SYSTEM RELATING TO A RESPONSE TO A REQUEST FOR AN APPLICATION KEY

(71) Applicant: Nokia Technologies Oy, Espoo (FI)

(72) Inventors: Markus Staufer, Munich (DE); Peter Schneider, Munich (DE); Ranganathan Mavureddi Dhanasekaran, Munich (DE); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 403 days.

(21) Appl. No.: 18/447,341

(22) Filed: Aug. 10, 2023

(65) Prior Publication Data

US 2024/0056805 A1 Feb. 15, 2024

(30) Foreign Application Priority Data

Aug. 12, 2022 (IN) ............................ 202241046181

(51) Int. Cl.

| | |
|---|---|
| ***H04W 12/02*** | (2009.01) |
| ***H04W 12/03*** | (2021.01) |
| ***H04W 12/0431*** | (2021.01) |
| ***H04W 12/06*** | (2021.01) |
| ***H04W 12/069*** | (2021.01) |
| ***H04W 12/08*** | (2021.01) |
| ***H04W 12/12*** | (2021.01) |

(52) U.S. Cl.
CPC ....... *H04W 12/0431* (2021.01); *H04W 12/03* (2021.01); *H04W 12/069* (2021.01)

(58) Field of Classification Search
CPC ........... H04W 12/0431; H04W 12/122; H04W 12/088; H04W 12/069; H04W 12/03; H04L 63/101
USPC .......................................................... 455/410
See application file for complete search history.

(56) References Cited

U.S. PATENT DOCUMENTS

2006/0002422 A1* 1/2006 Hurtta ............... H04M 15/8016 370/336
2013/0298209 A1* 11/2013 Targali .................. H04W 12/06 726/6
2019/0223009 A1* 7/2019 Salmela ............ H04W 12/0431
2023/0044647 A1* 2/2023 Castmo ................... H04W 4/44
(Continued)

OTHER PUBLICATIONS

IP.com search history (Year: 2025).*
(Continued)

*Primary Examiner* — Moustapha Diaby
(74) *Attorney, Agent, or Firm* — Brake Hughes Bellermann LLP

(57) ABSTRACT

A method is disclosed comprising: establishing an encrypted session with an application function based on a certificate; receiving a request for an application key from the application function using the encrypted session, wherein the request comprises a key identifier relating to a user device and an application function identifier; determining at least one response to the request for the application key from a set of possible responses, the set comprising at least a rejection and a message comprising the application key and a user device identifier; and transmitting the at least one response to the request for the application key to the application function. Furthermore, related methods, apparatuses, computer programs and systems are disclosed.

18 Claims, 7 Drawing Sheets

(56) References Cited

U.S. PATENT DOCUMENTS

2024/0064510 A1* 2/2024 Karakoc ............... H04W 12/72
2024/0223547 A1* 7/2024 Muñoz De La Torre Alonso ....... H04W 12/37
2024/0356742 A1* 10/2024 Tsiatsis ................. H04W 12/04

OTHER PUBLICATIONS

Extended European Search Report received for corresponding European Patent Application No. 23190439.2, dated Dec. 20, 2023, 14 pages.

Yang et al., "Formal Analysis of 5G AKMA", International Symposium on Dependable Software Engineering: Theories, Tools, and Applications, Nov. 18, 2021, pp. 102-121.

"3rd Generation Partnership Project; Technical Specification Group Services and System Aspects; Study on personal IoT networks security aspects (Release 18)", 3GPP TR 33.882, V0.1.0, Jun. 2022, pp. 1-8.

"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.6.0, Jun. 2022, 25 pages.

"3rd Generation Partnership Project; Technical Specification Group Services and System Aspects; Security architecture and procedures for 5G system (Release 17)", 3GPP TS 33.501, V17.6.0, Jun. 2022, pp. 1-292.

"New solution to KI#1: EAP based PIN deviceauthentication using Akma", 3GPP TSG-SA3 Meeting #108Adhoc-e, S3-222571, Agenda: 5.10, Nokia, Oct. 10-14, 2022, 2 pages.

"New solution using AKMA", 3GPP TSG-SA3 Meeting #109, S3-223309, Agenda: 5.10, Nokia, Nov. 14-18, 2022, 4 pages.

* cited by examiner

METHOD, APPARATUS AND SYSTEM RELATING TO A RESPONSE TO A REQUEST FOR AN APPLICATION KEY

TECHNICAL FIELD

Various example embodiments relate to a response to an request for an application key which may, e.g., be useable for establishing an application session between a user device and an application function.

BACKGROUND

Communication devices may be able to establish a secure session between each other based on functionality provided by a cellular network like 5G.

For example, the Third Generation Partnership Project (3GPP) has specified in the standard 3GPP TS 33.535 V17.6.0 Release 17 Authentication and Key Management for Applications (AKMA), which allow to establish security between an user device and an Application Function (AF), based on a key $K_{AF}$ that is derived by the user device as well as by the network. The AF may request this key $K_{AF}$ from the 5GS network. However, if the AF requesting the key $K_{AF}$ from the network cannot be identified/authenticated, there is a risk that the requests are abused.

Further, in AKMA, when an AF requests the application key $K_{AF}$, the AF may include a temporary identity, the A-TID, provided by the user device as part of a key identifier relating to the user device, e.g., the A-KID, as well as its own identity, e.g., AF_ID, into the request. In various scenarios it may occur that there is no specific protection of the A-KID when it is sent from a user device to a legal AF. So it must be assumed that an attacker can observe the A-KID. The attacker may operate an own malicious AF, and may abuse an observed A-KID in a malicious request by the attacker's AF. Assuming the network can reliably authenticate/identify the AF (see previous paragraph), the attacker's AF can (e.g. only) use its own AF_ID in this request. As the AF_ID is used as an input to derive the application key $K_{AF}$, in this case the attacker will not get an application key $K_{AF}$ that matches the application key $K_{AF}$ derived by the user device for the legal AF, to which the user device sent A-KID previously. So the malicious AF will not be able to impersonate the legal AF in subsequent communication with the user device. However, in various scenarios the network may not be able to decide whether an AF is authorized to receive a $K_{AF}$, so it might answer the malicious request. The answer might comprise not only an application key $K_{AF}$, but also a user device identity, e.g., GPSI, of the user device that sent the eavesdropped A-KID. So the attacker can abuse this interface to get device identities, e.g., GPSIs, which may be abused e.g. for spamming, and the attacker also gets the information what AF the user device with the revealed user device identity was trying to access (e.g., from the message the attacker observed in which the UE sent the A-KID), and can abuse this information.

Therefore, it is desirable to improve the security of mechanisms that use a respective functionality provided by a cellular network for establishing secure sessions between communication devices.

SUMMARY

According to a first example aspect, a method is disclosed. The method may be performed as at least part of an application function. The method comprises:

receiving, from a user device, an application session establishment request comprising a key identifier relating to the user device;

establishing an encrypted session with a network node of a cellular network based on a certificate;

transmitting a request for an application key to the network node using the encrypted session, wherein the request comprises the key identifier relating to the user device and an application function identifier;

receiving at least one response to the request for the application key, wherein the at least one response is from a set of possible responses comprising at least a rejection and a message comprising the application key and a user device identifier, and wherein the at least one response depends at least partly on the certificate; and transmitting, to the user device, an application session establishment response, wherein the application session establishment response is based on the received at least one response;

wherein the method further comprises at least one of option A or B, wherein according to option A, the certificate is assigned to the application function by the cellular network in a process of registering the application function with the cellular network, and the at least one response depends at least partly on the certificate in that the at least one response depends at least partly on an authentication of the application function based on the certificate; or wherein according to option B, the certificate is associated with an identifier assigned to the application function, and wherein the at least one response depends at least partly on the certificate in that the at least one response depends at least partly on a configurable setting stored by a network node of the cellular network, the configurable setting indicating whether the application function to which the identifier associated with the certificate is assigned is authorized to receive the message comprising the application key and the user device identifier.

This method may for instance be performed and/or controlled by an apparatus, for instance a server hosting a function (e.g. a central entity e.g. of a cellular network). Such a function may be the application function (AF). Thus, for example, the method may for instance be caused to be performed by an apparatus for an AF. The function may be internal or external to the cellular network (e.g., internal or external to an operator network). Alternatively, this method may be performed and/or controlled by more than one apparatus, for instance a server cloud comprising at least two servers. For instance, the method may be performed and/or controlled by using at least one processor of the central entity or the server.

An apparatus for an application function comprising at least one processor; and at least one memory storing instructions that, when executed by the at least one processor, may cause the apparatus at least to perform the method. The apparatus may comprise the application function, may be the application function, or may be comprised in the application function.

Further, a method according to a second example aspect is disclosed. The method may be performed as at least part of a function in a cellular network. The method may be performed by a network node. The method comprises:

establishing an encrypted session with an application function, AF, based on a certificate;

receiving a request for an application key from the application function using the encrypted session, wherein the request comprises a key identifier relating to a user device and an application function identifier;

determining at least one response to the request for the application key from a set of possible responses, the set comprising at least a rejection and a message comprising the application key and a user device identifier;

transmitting the at least one response to the request for the application key to the application function, wherein the method further comprises at least one of option A or B, wherein according to option A, the certificate is assigned to the application function by the cellular network in a process of registering the application function with the cellular network, and the determining of the at least one response to the request comprises authenticating the application function based on the certificate; or wherein according to option B, the certificate is associated with an identifier assigned to the application function, and wherein the determining of the at least one response to the request comprises determining the identifier associated with the certificate and determining, based on the identifier associated with the certificate, whether the application function is authorized to receive the message comprising the application key and the user device identifier, wherein the determining is based on a configurable setting stored by a network node of the cellular network that indicates whether the application function to which the identifier associated with the certificate is assigned is authorized to receive the message comprising the application key and the user device identifier.

This method may for instance be performed and/or controlled by an apparatus, for instance a server hosting one or more functions (e.g. the central entity) of a cellular network. Such functions may be the network exposure function (NEF) or the AKMA anchor function (AAnF). Thus, for example, the method may for instance be caused to be performed by an apparatus for an NEF and/or an AAnF. Alternatively, this method may be performed and/or controlled by more than one apparatus, for instance a server cloud comprising at least two servers. For instance, the method may be performed and/or controlled by using at least one processor of the central entity or the server.

A network node comprising at least one processor; and at least one memory storing instructions that, when executed by the at least one processor, may cause the network node at least to perform the method. In various embodiments, the network node may comprise a network exposure function, may be the network exposure function, or may be comprised in the network exposure function; and the application function may be external to the cellular network. In various embodiments, the network node may comprise an authentication and key management for applications anchor function, may be the authentication and key management for applications anchor function, or may be comprised in the authentication and key management for applications anchor function; and the application function may be internal to the cellular network.

Additionally, a method according to a third example aspect is disclosed. The method may be performed as at least part of a function in a cellular network. The method may be performed by a network node. The method comprises:

storing or retrieving a configurable setting, the configurable setting indicating whether an application function, to which an identifier associated with a certificate is assigned is authorized to receive a message comprising an application key and a user device identifier in response to a request for an application key, the request comprising a key identifier relating to a user device and an application function identifier; and interacting with another network node of a cellular network to provide, to the other network node, based on the configurable setting, information indicating whether the application function is authorized to receive the message comprising the application key and the user device identifier.

This method may for instance be performed and/or controlled by an apparatus, for instance a server hosting one or more functions (e.g. the central entity) of a cellular network. Such functions may be the unified data management (UDM) or the AAnF. Thus, for example, the method may for instance be caused to be performed by an apparatus for a UDM and/or an AAnF. Alternatively, this method may be performed and/or controlled by more than one apparatus, for instance a server cloud comprising at least two servers. For instance, the method may be performed and/or controlled by using at least one processor of the central entity or the server.

A network node comprising at least one processor; and at least one memory storing instructions that, when executed by the at least one processor, may cause the network node at least to perform the method. In various embodiments, the network node may comprise a network function, may be the network function, or may be comprised in the network function. The network function may be unified data management, or the network function may be authentication and key management for applications anchor function.

Moreover, a method according to a fourth example aspect is disclosed. The method may be performed by an apparatus for a user device. The user device may, for example, be or comprise a user equipment (UE). The method comprises:

transmitting, to an application function an application session establishment request comprising a key identifier relating to a user device;

receiving, from the application function, an application session establishment response, wherein the application session establishment response is based on at least one response to a request from the application function to a network node of a cellular network for an application key ($K_{AF}$), wherein the at least one response is from a set of possible responses comprising at least a rejection and a message comprising the application key ($K_{AF}$) and a user device identifier, and wherein the at least one response depends at least partly on a certificate used by the application function;

wherein the method further comprises at least one of option A or B, wherein according to option A, the certificate is assigned to the application function by the cellular network in a process of registering the application function with the cellular network, and the at least one response depends at least partly on the certificate in that the at least one response depends at least partly on an authentication of the application function based on the certificate; or wherein according to option B, the certificate is associated with an identifier assigned to the application function, and wherein the at least one response depends at least partly on the certificate in that the at least one response depends at least partly on a configurable setting stored by a network node of the cellular network, the configurable setting indicating whether the application function to which the identifier associated with the certificate is assigned is authorized to receive the message comprising the application key and the user device identifier.

This method may for instance be performed and/or controlled by an apparatus, for instance a user device of a cellular network, e.g., a user equipment (UE). An apparatus for a user device comprising at least one processor; and at least one memory storing instructions that, when executed by the at least one processor, may cause the user device at least to perform the method. In various embodiments the apparatus may comprise the user device, may be the user device or may be comprised in the user device. The user device may be a user equipment.

The following shall be disclosed for each of the above-described aspects, respectively:

(1) An apparatus or system configured to perform and/or control or comprising respective means for performing and/or controlling the method, the actions and/or the steps of the method according to the respective aspect.
 The means of the apparatus or system can be implemented in hardware and/or software. They may comprise for instance at least one processor for executing instructions for performing the required function, at least one memory storing the instructions and/or data, or both. Alternatively, they could comprise for instance circuitry that is designed to implement the required functions, for instance implemented in a chipset or a chip, like an integrated circuit. In general, the means may comprise for instance one or more processing means or processors.

(2) An apparatus or system (that in particular may comprise at least two apparatuses) comprising at least one processor and at least one memory storing instructions that, when executed by the at least one processor, cause an apparatus or system (e.g. the apparatus or the system) at least to perform and/or control the method according to the respective aspect.
 The disclosed apparatus performing the method according to the respective aspect may comprise only the disclosed components (e.g. means, processor, memory) or may further comprise one or more additional components.

(3) A computer program comprising instructions which, when executed by an apparatus, cause the apparatus to perform the method, the actions and/or the steps of the method according to the respective aspect
 The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM) or hard disk of a computer, or be intended for distribution of the program, like an optical disc).

(4) A tangible, non-transitory computer-readable medium storing a computer program code, the computer program code when executed by a processor causing an apparatus to perform and/or control the method, the actions and/or the steps of the method according to the respective aspect.

The term "non-transitory," as used herein, is a limitation of the medium itself (i.e., tangible, not a signal) as opposed to a limitation on data storage persistency (e.g., RAM vs. ROM).

Furthermore, a system is disclosed, the system comprising one or more of the above-described apparatuses according to the various example aspects.

Any disclosure herein relating to any example aspect is to be understood to be equally disclosed with respect to any subject-matter according to the respective example aspect, e.g. relating to an apparatus, a method, a computer program, and a computer-readable medium. Thus, for instance, the disclosure of a method step shall also be considered as a disclosure of means for performing and/or configured to perform the respective method step. Likewise, the disclosure of means for performing and/or configured to perform a method step shall also be considered as a disclosure of the method step itself. The same holds for any passage describing at least one processor; and at least one memory storing instructions that, when executed by the at least one processor, cause an apparatus at least to perform a step.

For convenience, a list of abbreviations used in the following is already given at this point:

3GPP Third Generation Partnership Project
5GS 5G System
AAA Authentication Authorization Accounting
AAnF AKMA Anchor Function
AF Application Function
A-KID AKMA Key Identifier
AKMA Authentication and Key Management for Applications
API Application Programming Interface
A-TID AKMA Temporary UE Identifier
CA Certification Authority
EAP Extensible Authentication Protocol
FQDN Fully Qualified Domain Name
GPSI Generic Public Subscription Identifier
HN Home Network
IETF Internet Engineering Task Force
IoT Internet of Things
$K_{AF}$ Application Key, e.g., AKMA Application Key
$K_{AKMA}$ Anchor Key, e.g., an AKMA Anchor Key
$K_{AUSF}$ Key, e.g., stored by Authentication Server Function
KDF Key Derivation Function
MNO Mobile Network Operator
MSK Master Session Key
NEF Network Exposure Function
NF Network Function
OAuth Open Authorization
PE PIN Element
PEGC PIN Element with Gateway Capability
PIN Personal IoT Network
PKI Public-Key Infrastructure
PO PIN owner
RA Registration Authority
RID Routing Indicator
SUPI Subscription Permanent Identifier
TLS Transport Layer Security
UDM Unified Data Management
UE User Equipment In the following, example details and example embodiments of the various example aspects introduced above will be described.

The method according to the fourth example aspect may comprise:

transmitting, to an application function (AF), an application session establishment request comprising a key identifier (A-KID) relating to the user device.

The method according to the first example aspect, e.g. being performed by an apparatus for the AF, may, e.g., correspondingly, comprise:

receiving, from a user device, an application session establishment request comprising a key identifier (A-KID) relating to the user device.

The AF may be an element of a/the cellular network, e.g., a 5G network. It may provide application services, e.g., to a subscriber of the network.

The apparatus for the AF may be a server. It may be an apparatus that is configured for causing performing at least part of the AF. The apparatus may operate as at least part of the AF. It may additionally perform other functions, e.g., provide cloud functionality and/or operate as at least part of an authentication, authorization and accounting, AAA, server for a network.

The user device may, for example, be a user equipment (UE). It may be capable of connecting to a cellular network, e.g., a 5G network, for example using a radio interface. Various devices may act as a user device, e.g., smartphones.

Transmitting the application session establishment request from the user device to the AF may have the goal of establishing a secure session between the user device and the AF, e.g., based on an application key $K_{AF}$. The application key $K_{AF}$ may be considered to be a shared secret key between the user device and the AF (at least in case of successful application session establishment). Specifically, the application key may be an AKMA application key.

As described above, the application session establishment request may comprise a key identifier relating to the user device. A reason for this may be that the key identifier relating to the user device may be required by the AF to request the application key $K_{AF}$.

The key identifier relating to the user may allow identifying a user device and/or one or more keys of the user device, e.g., an AKMA key $K_{AKMA}$. For example, the key identifier relating to the user device may be an identifier in the format username@realm, e.g., the AKMA key identifier A-KID. Username may comprise a routing indicator (RID) and a temporary ID (A-TID), e.g., an AKMA temporary identifier A-TID. The realm may comprise the home network (HN) identifier. A user device and its AKMA key may be identified in its HN based on its temporary ID A-TID.

The temporary identifier A-TID may be determined (e.g. calculated) using a cryptographic one-way function. The one way function may be called key derivation function (KDF). At least one of a user device identifier, e.g., the UE's Subscription Permanent Identifier (SUPI), and an authentication server function (AUSF) key $K_{AUSF}$ may be input parameters to the function. At least one of the result of the function and the corresponding SUPI may be stored in a database, e.g., using A-KID or A-TID as a key.

Depending on the implementation an AKMA temporary identifier (A-TID) might be used as a key identifier relating to the user device instead of A-KID.

The method according to the first example aspect, e.g. being performed by the apparatus for the AF, may comprise:

transmitting a request for an application key ($K_{AF}$) to the network node using an encrypted session, wherein the request comprises the key identifier (A-KID) relating to the user device and an application function identifier (AF_ID).

The method according to the second example aspect may comprise:

receiving a request for an application key ($K_{AF}$) from the AF using an encrypted session, wherein the request comprises a key identifier (A-KID) relating to a user device and an application function identifier (AF_ID).

In various embodiments, the network node to which the request for the application key ($K_{AF}$) is transmitted (e.g., the network node which receives the request, e.g., performing the method according to the second example aspect) may operate as at least part of a network exposure function, NEF, of the cellular network, and the AF may be external to the cellular network. NEF may be located between an operator's network, e.g., a 5G core network, and external third-party AFs (e.g. and possibly some internal AFs). It may be responsible for managing the external open network data, and external applications that want to access the internal data of the network may need to pass through the NEF.

Alternatively, in various embodiments, the network node to which the request for the application key ($K_{AF}$) is transmitted (e.g., the network node which receives the request, e.g., performing the method according to the second example aspect) operates as at least part of an authentication and key management for applications (AKMA) anchor function, AAnF, of the cellular network, and the AF is internal to the cellular network. The AAnF may have the role of generating and/or managing session keys which may be provided to applications for further use (e.g., protecting communication between a user device and an application server). AAnF may belong to the home public land mobile network (HPLMN). It may maintain the AKMA context for a user device. The AKMA context may comprise at least one of a user device identifier (e.g., a subscription permanent identifier (SUPI)), an AKMA key identifier A-KID, or an AKMA Anchor Key $K_{AKMA}$.

Thus, it may be possible that, in various embodiments, an AF (e.g., a trusted AF) can request (e.g., directly) the application key from an AAnF. For example in such a scenario, one or more actions/steps relating to authentication of an AF, e.g., based on the certificate, may be done by an AF. For example, it may be one or more of those actions/steps that are described herein, e.g., as being possibly performed by an NEF. Additionally or alternatively, one or more actions relating to authorization of the AF (e.g., based on an identifier for the AF) may be done by the AAnF, for example any one or more of the steps or actions that could otherwise be performed by an UDM.

The request for the application key may comprise the key identifier (for instance the AKMA key identifier A-KID or the AKMA temporary identifier A-TID) that was previously received from the user device. The key identifier relating to the user device may enable the cellular network to identify another key of the user device, e.g., an AKMA key $K_{AKMA}$.

Additionally or alternatively, the request may comprise an application function identifier (AF_ID).

Both pieces of information, i.e., the key identifier relating to the user device, and the application function identifier may be used by the network node in the derivation of the application key $K_{AF}$. For instance, the application key $K_{AF}$ may be derived based on key of the user device, e.g., $K_{AKMA}$, and an application function identifier AF_ID. As described above, the key of the user device, e.g., an AKMA key $K_{AKMA}$, may be identified based on the key identifier of the user device.

The deriving of the application key $K_{AF}$ may be done using the KDF. Specifically, the application key $K_{AF}$ may be derived as $K_{AF}$=KDF($K_{AKMA}$, AF_ID).

Deriving the application key $K_{AF}$, especially using the KDF, may or may not be part of the method according to the second (and/or of the fourth) example aspect. In various embodiments, the method according to the second example aspect may comprise:

interacting with another network node to obtain the application key ($K_{AF}$) and a version of the user device identifier.

The other network node may be a network node performing at least part of an AAnF. The interacting may comprise transmitting a request and receiving a response. For example, the request, e.g., a Naanf_AKMA_AFKey_Request, may comprise the key identifier of the user device and the application function identifier. The response, e.g., Naanf_AKMA_AFKey_Response, may comprise at least one of an application key $K_{AF}$, an application key expiry time, or a user equipment respectively user device identifier. The user equipment identifier may be provided in a pre-defined version. For example, it may be provided in a format that is used only inside the cellular network, e.g., as Subscription Permanent Identifier (SUPI). In various embodiments the version of the user device identifier may be convertible to another version, e.g., an external ID format, e.g., GPSI, for example by an NEF.

The application key $K_{AF}$ may be derivable and/or may be derived based on a key (e.g., $K_{AKMA}$) that is identified by at least part of the key identifier (A-KID) relating to the user device and the application function identifier (AF_ID), e.g., using a cryptographic one-way function.

As described before, the request for the application key $K_{AF}$ may be transmitted/received using an encrypted session.

To that end, the method according to the first example aspect may comprise:

establishing an encrypted session with a network node of a cellular network based on a certificate.

The method according to the second example aspect may, e.g., correspondingly, comprise:

establishing an encrypted session with an AF based on a certificate.

The encrypted session may be a transport layer security (TLS) session. However, other types of encrypted sessions are possible.

Moreover, protection (e.g., of the session) by adding one or more message authentication codes (MACs) (e.g., to the session and/or one or more messages, requests, and/or responses) might be applied. In various scenarios, this might ensure the integrity and/or the legal origin of one or more messages. However, not all the session needs necessarily be encrypted. In various embodiments, encryption may be used for the transmitted key, e.g., only. One or more MACs may be used additionally or alternatively.

The purpose of establishing the encrypted session with the network node may be to enable the network node (or the cellular network) to identify/authenticate the requesting AF. Therefore, the certificate may be signed in a way that it can be verified based on the operator CA of the cellular network.

In various embodiments (especially those that are denoted as "option A" herein), the certificate may be assigned to the AF e.g. by the cellular network in a process of registering the AF with the cellular network. For example, an interface may be provided by a cellular network, e.g., a 5GS, that can be used by new AFs to register with the cellular network. In this process, the AF may provide a public key and may prove possession of the respective private key.

In various embodiments (especially those that are denoted as "option B" herein), the certificate may be associated with an identifier assigned to the AF. For example, in various embodiments, the identifier that is assigned to the AF and that is associated with the certificate may consist of or comprise a client identifier (client ID) that was assigned to the AF by the cellular network. In various embodiments, the client identifier may be assigned to the AF in the process for registering the AF with the cellular network, like the certificate. Thus, the client identifier and a certificate may be assigned to the AF together in a process of registering the AF with the cellular network. The certificate (e.g., an operator-AF-certificate) may relate a public key of the AF to the client ID.

The interface that can be used by new AFs to register with the cellular network may be provided by a registration authority (RA) which may be part of an operator PKI. The PKI may do the book-keeping for the assigned client IDs. The PKI may additionally or alternatively perform regular PKI tasks related to the operator-AF-certificates, for instance providing a revocation mechanism.

Example embodiments of all aspects may or may not comprise verifying the identity of an AF in the process of assigning the certificate. For example, the cellular network may simply assign a unique client ID and/or create a certificate. However, some general IT security measures might be used to prevent abuse of the interface, e.g. a mitigation against flooding attacks.

At least one of the certificate or the identifier associated with the certificate may contribute to increasing the security of mechanisms that use functionality provided by a cellular network for establishing secure sessions between communication devices, as described in more detail in the following.

The method according to the second example aspect may comprise:

determining at least one response to the request for the application key ($K_{AF}$) from a set of possible responses, the set comprising at least a rejection and a message comprising the application key ($K_{AF}$) and a user device identifier;

The set of possible responses may consist of or comprise the rejection and the message comprising the application key in the user device identifier or it may comprise further message types. For example, in various embodiments, the at least one response may correspond to an error and/or the AF may receive an error. This may, e.g., occur when authentication and/or authorization, e.g. at the NEF and/or AAnF fails. The error may, e.g., have a different error code than a rejection.

In various embodiments of the method according to the second example aspect (especially those denoted as "option A" herein), the determining of the at least one response to the request may comprise authenticating the AF based on the certificate. For example, the AF may be authenticated by a network node (e.g., operating as at least part of an NEF) based on the certificate and proof of possession of a respective private key corresponding to the public key of the certificate. The authenticating may allow to ensure that the AF is legally using the AF_ID it provided in the request for the application key. Legally using an AF_ID may be understood to mean that an AF uses its own AF_ID, e.g., an AF_ID that was assigned to the AF. The opposite of "legally using an AF_ID" may be that an AF, e.g., a rogue AF, uses a "stolen" AF_ID, e.g., an AF_ID that is assigned to another AF. In various embodiments, the response to the request for the application key may correspond to a rejection if the authenticating of the AF failed. The rejection may be configured in such a way that it does not comprise the application key. Additionally or alternatively, it may be configured in such a way that it does not comprise the user device identifier. Additionally or alternatively, the response to the request for the application key may correspond to the message comprising the application key and the user device identifier only under the condition that the authentication of the AF was successful. Either way, the risk for abuse of requests for the application key ($K_{AF}$) with, e.g., stolen AF_IDs may be reduced.

The user device identifier that may be comprised in the message may be an external ID relating to a user device. The user device identifier may be based on a version of the user identifier obtained from another network node. For example, the user device identifier may be a GPSI that is based on a SUPI.

In various scenarios, a user device identifier might be abused by a rogue AF, e.g., to spam a corresponding user device. Therefore, it is desirable to avoid providing the user device identifier to a rogue AF, e.g., in a message in response to a request for an application key.

To that end, in various embodiments (especially those denoted as "option B" herein), the certificate may be associated with an identifier assigned to the AF, as described before. In such embodiments, the determining of the at least one response to the request may comprise determining the identifier associated with the certificate and determining, based on the identifier associated with the certificate, whether the AF is authorized to receive the message comprising the application key $K_{AF}$ and the user device identifier. In various embodiments, the response to the request for the application key will correspond to the rejection if it is determined that the AF is not authorized to receive the message comprising the application key $K_{AF}$ and the user device identifier. Additionally or alternatively, the response to the request for the application key may correspond to the message comprising the application key and the user device identifier only under the condition that the authorization of the AF was successful. Thus, determining whether the AF is authorized to receive the message comprising the application key $K_{AF}$ and the user device identifier may contribute to avoiding that the user device identifier is provided to a rogue AF.

Example embodiments of all aspects comprising "option A" do not necessarily comprise "option B" and may still contribute to an increased security of mechanisms that use functionality provided by a cellular network for establishing secure sessions between communication devices, e.g., due to authentication.

Similarly, example embodiments of all aspects comprising "option B" do not necessarily comprise "option A" and may still contribute to an increased security of mechanisms that use functionality provided by a cellular network for establishing secure sessions between communication devices, e.g., due to authorization.

Nonetheless, example embodiments of all aspects comprising "option A" may also comprise "option B" (and vice versa). Such embodiments may contribute to an increased security of mechanisms that use functionality provided by a cellular network for establishing secure sessions between communication devices due to authentication and authorization. Authentication and authorization may work synergistically together as the authentication may be used to ensure that an attacker's AF can (e.g. only) use its own AF_ID in a request for an application key while the authorization may ensure that only authorized AFs are provided a response to the request that comprises an application key and a user device identifier.

In various embodiments, determining the identifier that is assigned to the AF and that is associated with the certificate may be based on the certificate. For example, as described before, the certificate may relate a public key of an AF to a client ID. This may be used by a network node, e.g., operating as at least part of an NEF, to determine the identifier that is assigned to the AF based on the certificate. However, other ways to determine the identifier are possible. For example, the cellular network (or a network node therein) may store information that link certificates to respective identifiers. Yet other ways are possible.

For example, in various embodiments, the certificate may be associated with the identifier assigned to the AF by means of a token from an authorization server, wherein the request for the application key ($K_{AF}$) from the AF further comprises the token, and wherein the identifier that is assigned to the AF and associated with the certificate is determined based on the token. An example of such a token may be an Open Authorization (OAuth) authorization token. It may have been retrieved by an apparatus (and/or an AF) performing the method according to the first aspect.

For example, in various embodiments of the method according to first example aspect, the certificate is associated with the identifier assigned to the AF by means of a token, wherein the request for the application key ($K_{AF}$) to the network node further comprises the token, and wherein the token forms a basis for the network node to determine the identifier that is assigned to the AF and associated with the certificate, and wherein the method comprises:

requesting the token from an authorization server based on the certificate;

receiving the token from the authorization server.

The authorization server may be an OAuth authorization server. OAuth may provide clients (e.g., an AF) a "secure delegated access" to network resources on behalf of an resource owner (e.g., an NEF). It specifies a process for resource owners to authorize third-party access to their resources without providing credentials. Specifically, OAuth allows access tokens to be issued to third-party clients (e.g., AFs) by an authorization server, with the approval of the resource owner. The third party (e.g., the AF) may then use the access token to access the protected resources (e.g., send a valid request for an application key to the network node operating as at least part of an NEF). It is to be understood that any other "secure delegated access" concept may be used, e.g., any concept that relies on an authorization server to provide a token to an AF, the token, when being provided to the network node, enabling a network node to determine the identifier that is assigned to the AF.

Thus, there are various way how the identifier assigned to an AF may be determined. The identifier may then form the basis for determining whether the AF is authorized to receive a message comprising an application key and a user device identifier.

In various embodiments, the determining whether the AF is authorized to receive the message comprising the application key $K_{AF}$ and the user device identifier is based on a configurable setting stored by a network node of the cellular network that indicates whether the AF to which the identifier associated with the certificate is assigned is authorized to receive the message comprising the application key $K_{AF}$ and the user device identifier. The network node may be the same network node that performs the method according to the second example aspect, for example, a network node operating as at least part of an NEF. Alternatively, it may be another network node in the network, e.g., operating as at least part of an AAnF or UDM.

Therefore, in various embodiments, the determining, based on the identifier associated with the certificate, whether the AF is authorized to receive the message comprising the application key $K_{AF}$ and the user device identifier may comprise interacting with another network node to obtain, from the other network node, information indicating whether the AF is authorized to receive the message comprising the application key $K_{AF}$ and the user device identifier. The interaction may comprise a request, e.g., transmitted as part of the method according to the second example aspect, and a response to the request, e.g., received as part of the method according to the second example aspect. The network node being on the other side of the interaction, i.e., receiving the request and providing the response, may perform the method according to the third example aspect.

The method according to the third example aspect further may comprise:

storing or retrieving a configurable setting, the configurable setting indicating whether an AF to which an identifier associated with a certificate is assigned is authorized to receive a message comprising an application key ($K_{AF}$) and a user device identifier in response to a request for an application key ($K_{AF}$), the request comprising a key identifier (A-KID) relating to a user device and an application function identifier (AF_ID); and interacting with another network node (e.g., a network node performing the method according to the second example aspect) of the cellular network to provide, to the other network node, based on a configurable setting, information indicating whether the AF is authorized to receive the message comprising the application key ($K_{AF}$) and the user device identifier.

The configurable setting may be configurable by a network operator. Additionally or alternatively, in various example embodiments, the configurable setting may be configurable by a subscriber of the cellular network and/or an owner of the subscriber of the cellular network.

To that end, an interface may be provided by which the subscriber can configure in the cellular network, e.g., the 5GS, one or more identifiers (e.g., client IDs) assigned to respective AFs that the subscriber authorizes to make requests for an application key. The cellular network (e.g., a network node in the cellular network that performs the method according to the third example aspect) may store, e.g., per subscription for one or more subscriptions, the list of these allowed identifiers.

In case of enterprise, enterprise may configure one or more client IDs of (e.g., respective) allowed one or more AFs, e.g., to each of their subscriber. For example, in case of an entity, like an enterprise, comprising several (e.g., individual) subscribers, the entity can configure the client ID of allowed AFs for one or more (or each) of the subscribers.

The storing may be done at a UDM. If the method according to the third example aspect is performed by a network node that performs as at least part as another function than UDM, e.g., AAnF, the network node (e.g., the AAnF) may retrieve the configurable setting, for example from a network node that performs as at least part of an UDM and/or stores the configurable setting.

So various embodiments allow the subscriber to inform the cellular network which (e.g., external) AFs the subscriber authorizes. In other words, various embodiments allow the subscriber to give user consent to requests by (e.g., external) AFs. Accordingly, it may be the choice of the subscriber which (e.g., external AFs) are trusted by the subscriber and/or should be allowed to retrieve an application key, e.g., $K_{AF}$, and/or learn a user device identifier, e.g., a UE's GPSI.

In various embodiments, the configurable setting may be created via an apparatus for a user device and/or a UE. For example, a subscriber may decide what AFs are to be authorized. The subscriber may provide this information to the network via the UE. This may be useful as UE (that may be acting on behalf of the subscriber) can, in various scenarios, be authenticated by existing mobile network mechanisms, e.g., before the network may accept from the UE the information.

The storing or retrieving may be done based on the identifier that is associated with the certificate. For example, in a database the configurable setting relating to an AF may be identified based on the identifier, e.g., using the identifier as search key.

Further, in the interacting with another network node and/or in the retrieving, the identifier may be comprised in one or more exchange messages (e.g., a request and/or response) to identify the application function.

The following steps may, for example, happen after the at least one response to the request for the application key ($K_{AF}$) has been determined.

The method according to the second example aspect may comprise:

transmitting the at least one response to the request for the application key $K_{AF}$ to the AF.

The method according to the first example aspect, e.g. being performed by the apparatus for the AF, may comprise:

receiving at least one response to the request for the application key $K_{AF}$, wherein the at least one response is from a set of possible responses comprising at least a rejection and a message comprising the application key $K_{AF}$ and a user device identifier, and wherein the at least one response depends at least partly on the certificate.

It has been described above how the at least one response depends at least partly on the certificate.

For example, in various embodiments (especially those denoted as "option A" herein), the certificate is assigned to the AF by the cellular network in a process of registering the AF with the cellular network, and the at least one response may depend at least partly on the certificate in that the at least one response depends at least partly on an authentication of the AF based on the certificate, e.g., by an NEF.

Additionally or alternatively, in various embodiments (especially those denoted as "option B" herein), the certificate is associated with an identifier assigned to the AF, and wherein the at least one response depends at least partly on the certificate in that the at least one response depends at least partly on a configurable setting stored by a network node of the cellular network, the configurable setting indicating whether the AF to which the identifier associated with the certificate is assigned is authorized to receive the message comprising the application key $K_{AF}$ and the user device identifier.

An apparatus performing the method according to the first example aspect may not "know" in advance whether the at least one response to the request for the application key $K_{AF}$ will correspond to a rejection or to a message comprising an application key $K_{AF}$ and comprising a user device identifier. Thus, the apparatus may be capable of processing any response from the set of possible responses.

The method according to the first example aspect, e.g. being performed by the apparatus for the AF, may further comprise:

transmitting, to the user device, an application session establishment response, wherein the application session establishment response is based on the received at least one response.

The method according to the fourth example aspect, e.g., being performed by an apparatus for the user device, may further comprise:

receiving, from the application function, the application session establishment response.

The application session establishment response received in the method according to the fourth example aspect may have the same properties described above with respect to the application session establishment response transmitted in the method according to the first example aspect. For example, it may also be based on the at least one response to the request from the application function to the network node of a cellular network for an application key $K_{AF}$.

If the at least one response to the request for an application key $K_{AF}$ corresponds to a rejection, the application session establishment response may also correspond to a rejection. In such a case the application session establishment response may comprise, e.g., a failure cause. The user device may then trigger a new application session establishment request.

On the other hand, if the at least one response to the request corresponds to message comprising the application key $K_{AF}$ and a user device identifier, the application session establishment response may successfully establish the application session, e.g., based on the application key $K_{AF}$. The application key may be secret and/or may have been derived by the user device as well so that it may be a shared key between the application function and the user device.

As described before with regard to the network node performing the method according to the first example aspect, also the user device may not "know" in advance whether application session establishment response will successfully establish the application session or indicate a failure. Thus, the user device may be capable of processing any application session establishment response.

In various embodiments, the method according to the fourth example aspect may further comprise:

obtaining information from the cellular network indicating one or more AFs for which a respective configurable setting stored by a network node of the cellular network indicates that the respective AF to which the identifier associated with the certificate is assigned is authorized to receive the message comprising the application key $K_{AF}$ and the user device identifier.

For example, the availability of AFs can be configured to a user device after the user device has attached to the (cellular) network. Existing mechanisms, like UE Configuration Update, can be reused for this purpose. The information to be configured on the user device may comprise one or more AF_IDs. For example, in various embodiments, a network node may store one or more configurable settings that indicate that one or more AFs (identifiable, e.g., by their respective application function identifier AF_ID) have been assigned a same identifier (e.g., a same client ID) and that are authorized to request an application key. Such information may, for example, be stored as part of subscription data of a user device. The user device may be informed about one or more of all of these AFs.

In various embodiments, the subscriber may authorize a AF and/or client id and/or AF client id, and/or it may learn, e.g., from the network, what one or more AF_IDs may use this client id.

In various embodiments described above, a client identifier has been described as an example of an identifier associated with a certificate and assigned to an AF. However, additionally or alternatively, in various embodiments, the identifier that is assigned to the AF and that is associated with the certificate consists of or comprises the application function identifier (AF_ID). The application function identifier (AF_ID) may be associated with the certificate at least by the fact that the application function identifier and the certificate are assigned to/identify the same AF.

It may be possible to use the application function identifier instead of the client identifier as the identifier assigned to the AF in various embodiments described above, e.g., in the determining, based on the identifier associated with the certificate, whether the AF is authorized to receive the message comprising the application key ($K_{AF}$) and the user device identifier, wherein the determining is based on a configurable setting stored by a network node of the cellular network that indicates whether the AF to which the identifier associated with the certificate is assigned is authorized to receive the message comprising the application key ($K_{AF}$) and the user device identifier. The principle of using the AF identifier instead of the client identifier as the identifier assigned to the AF may be used in other contexts as well.

Another option is that the identifier assigned to the AF and, e.g., used in the determining whether the AF is authorized, may consist of or comprise both, the application function identifier and the client identifier. A subscriber may use this to not only configure a client ID (which may be assigned to multiple AFs) which, e.g., may be authorized for requesting the AF, but additionally or alternatively a list of one or several AF_IDs associated with the client ID (and, e.g., this subscriber). The one or several AF_IDs may be, e.g., respectively authorized for requesting the AF (or not). In this way, the subscriber can restrict the authorization for a client ID further to certain AF_IDs, e.g., on a finer granularity.

Various embodiments may be used in the context of another (additional) network that is different from the cellular network described above.

Specifically, in various embodiments of the method according to the fourth example aspect, the user device may, e.g., additionally, be part of a network different from the cellular network, the network comprising the user device and comprising at least one apparatus without the (e.g., temporary or permanent) capability to connect to the cellular network. For example in such scenarios, the method may comprise operating as a gateway to the cellular network for the at least one apparatus without the capability to connect to the cellular network.

It may be desirable to establish a secure link between the at least one apparatus and the user device when the user device is operating as a gateway for the at least one apparatus without the capability to connect to the cellular network. An authentication, authorization and accounting, AAA, server may be used for this.

In various embodiments, the method according to the first example aspect, e.g., performed as at least part of an AF, may comprise:

operating as at least part of an authentication, authorization and accounting, AAA, server for a network different from the cellular network, the network comprising the user device and comprising at least one apparatus without the capability to connect to the cellular network.

However, for the user device to use the AAA server it might be beneficial to have a secure channel between the user device and the AAA server. As the AAA functionality may be performed by a same apparatus (e.g., server) that operates as at least part of an AF, various embodiments described above may be used to establish an application session between the user device and the AF/AAA server, e.g., based on the application key $K_{AF}$ that may (in a successful case) be retrieved by an AF in a response to a request for an application key $K_{AF}$.

Some example embodiments of all aspects will now be described with reference to the accompanying drawings. It is to be understood, however, that the drawings are designed solely for purposes of illustration and only serve as non-limiting examples. It should be further understood that the drawings are not drawn to scale and that they are merely intended to conceptually illustrate the structures and procedures described herein.

BRIEF DESCRIPTION OF THE FIGURES

It is shown in.

DETAILED DESCRIPTION OF EXAMPLE EMBODIMENTS

Figure 1:
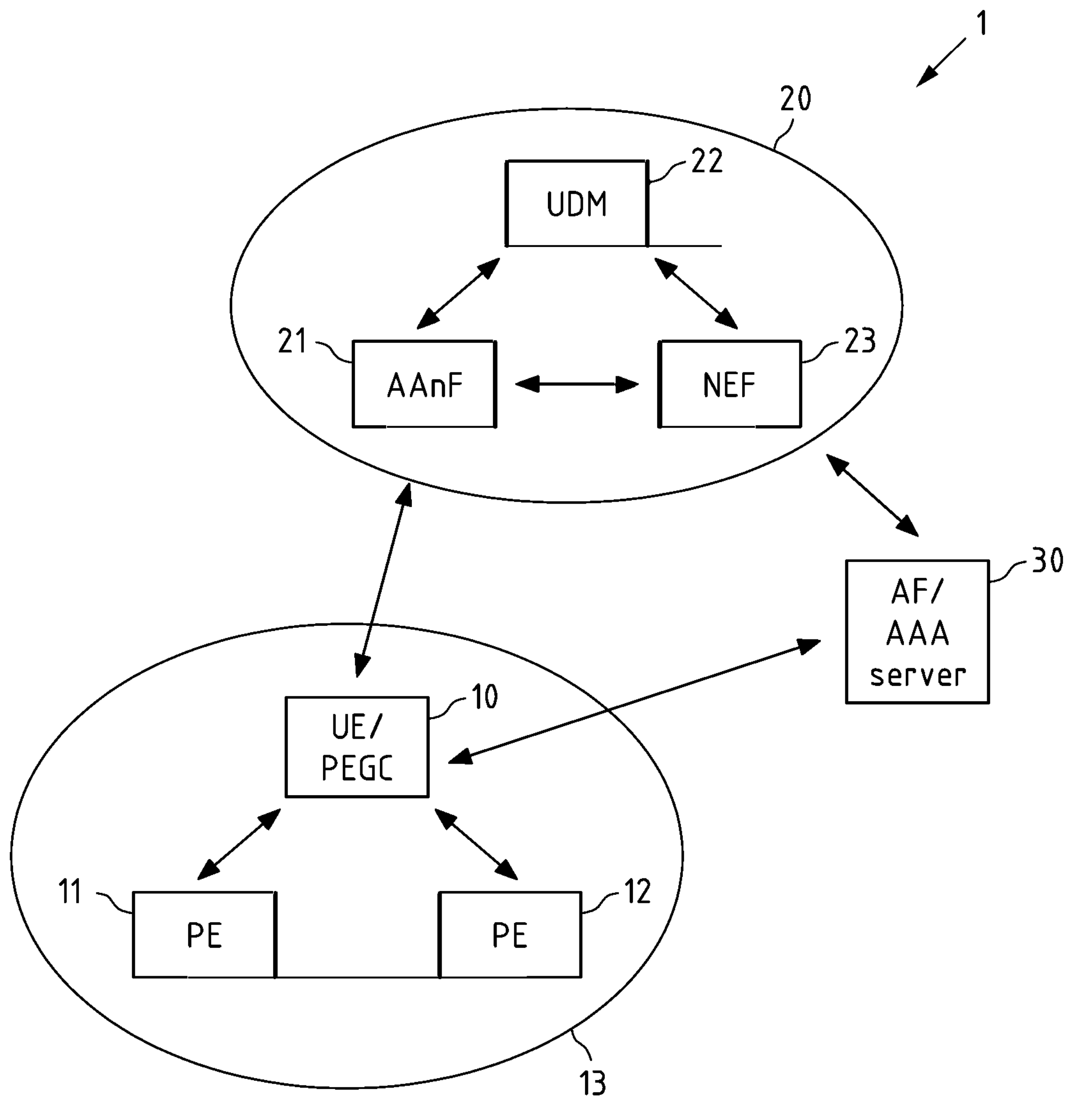
FIG. 1 a schematic diagram of a system according to an example embodiment.

FIG. 1 shows a schematic diagram of a system 1 according to an example embodiment.

The system 1 comprises a cellular network 20, e.g., a 5G network. The cellular network 20 may comprise multiple functions. A function may be a logical entity. An apparatus, e.g., a network node, may be configured for and/or operate as a function (or as multiple functions). The three functions shown, by way of example, in FIG. 1 as part of the cellular network 20 are AAnF 21, UDM 22, and NEF 23.

It is to be understood that these functions are only examples for illustration. Specifically, for example, when referring to UDM 22, it is to be understood that whenever it is described that UDM 22 may be involved in an action and/or interaction, UDM is not necessarily the only function involved in that action/interaction. For example, in various scenarios where it is described that another network function interacts with UDM, it may mean that UDM does not directly interact with this other network function but, e.g., through and/or by means of AUSF or another network function. So whenever it is referred to "UDM 22", this may also be read as "AUSF/UDM 22".

Additionally, the function AF is shown as part of an apparatus operating as at least part of an AF that may, by way of example, also operate as at least part of an AAA server, i.e., AF/AAA server 30. By way of example the AF/AAA server 30 is shown to be located outside of the cellular network 20. However, the AF/AAA server 30 might instead be located inside the cellular network 20.

The AF/AAA server 30 may be able to communicate/interact with the cellular network 20, e.g., with functions and/or network nodes of the cellular network 20. If the AF/AAA server 30 is located outside the cellular network 20, the communication may be based on an, e.g., an N33 interface between AF 30 and NEF 23. If the AF/AAA server 30 is located inside the cellular network 20, the communication may be based on an, e.g., an N62 interface between AF 30 and AAnF 21.

Further, a UE 10 is shown. The UE 10 may be capable of communication with the cellular network 20. Additionally, the UE 10 may be capable of communication with the AF/AAA server 30, e.g., using a Ua* interface.

Merely as a non-limiting example, UE 10 is part of another network 13. By way of example, network 13 is shown as a personal internet of things network (PIN).

By way of example, UE 10 acts as a gateway of the network 13, i.e. as a "PIN element with gateway capabilities" (PEGC), that can connect to the cellular network 20 as a UE (shown as UE/PEGC 10). Additionally, the network 13 is shown to comprise two PIN elements without gateway capabilities and without the capability to connect to the cellular network 20. The latter are called PEs 11, 12, excluding the PEGC 10 from this term. PEs 11, 12 and/or PEGC 10 use some means for local, e.g., wireless, communication (e.g. WiFi or Bluetooth). By way of example, the person or organization operating the PEGC(s) 10 and/or deciding which PEs 11, 12 are admitted to the PIN is called the PIN owner (PO) herein. While a PIN can be a small network, e.g. a body-network with a single PEGC 10 and a few PEs 10, 11, it can also be a much larger installation, comprising for example dozens of PEGCs 10 and/or dozens, hundreds, or thousands of PEs 11, 12.

Secure PINs preferably use secure wireless links between PEs 11, 12 and PEGC(s) 10. The security protocol may be depending on the overall communication protocol within the PIN. But independent of the specific protocol, it may be favorable to establish credentials between PE 11, 12 and PEGC 10 to allow mutual authentication as the basis of establishing secure communication. In use cases restricted to only a few PEs 11, 12, credential provisioning may be done by the user of the PIN configuring a passphrase on the PEGC 10 and PE 11, 12. This may be potentially be done using techniques that ease the configuring of the passphrase on the PE 11, 12, such as wireless protected setup in WiFi networks. However, in use cases with multiple PEGCs 10 and/or large numbers of PEs 11, 12, and consequently potentially frequent additions or removals of PEs 11, 12, more automated procedures may be useful. Moreover, a passphrase shared by all PEs 11, 12 is preferably avoided. In particular, rather than configuring credentials for PEs 11, 12 on multiple PEGCs 10, the credentials should preferably be configured on a central AAA server 30. AAA may refer to Authentication (to identify), Authorization (to give permission) and Accounting (to log an audit trail), and an AAA framework may be used to control and track access within a network.

An authentication protocol like the Extensible Authentication Protocol (EAP) framework can be used then to authenticate PEs 11, 12 and establish a key (called MSK in the EAP framework) shared between the PE 11, 12 and the PEGC 10, like in Enterprise WiFi Protected Access specified by the WiFi Alliance.

The PO may want to deploy the AAA server 30 on centralized resources, e.g. in a cloud. It may then be desirable to establish one or more secure channels between the PEGC(s) 10 and the AAA server which can be used to transmit the authentication message(s) and in particular to send the MSK from the AAA server 30 to the PEGC 10.

As mentioned before, the Third Generation Partnership Project (3GPP) has specified in the standard 3GPP TS 33.535 V17.6.0 Release 17 Authentication and Key Management for Applications (AKMA) which allows to establish security between a UE 10 and an AF 30 based on a key $K_{AF}$ that is derived by the user device as well as by the network 20, and is passed to the AF 30 by the network 20. With the PEGC as UE 10 and the AAA server as AF 30, AKMA may provide some functionality that may be used to establish the secure channels in the PIN use case described in the previous paragraph.

Figure 2:
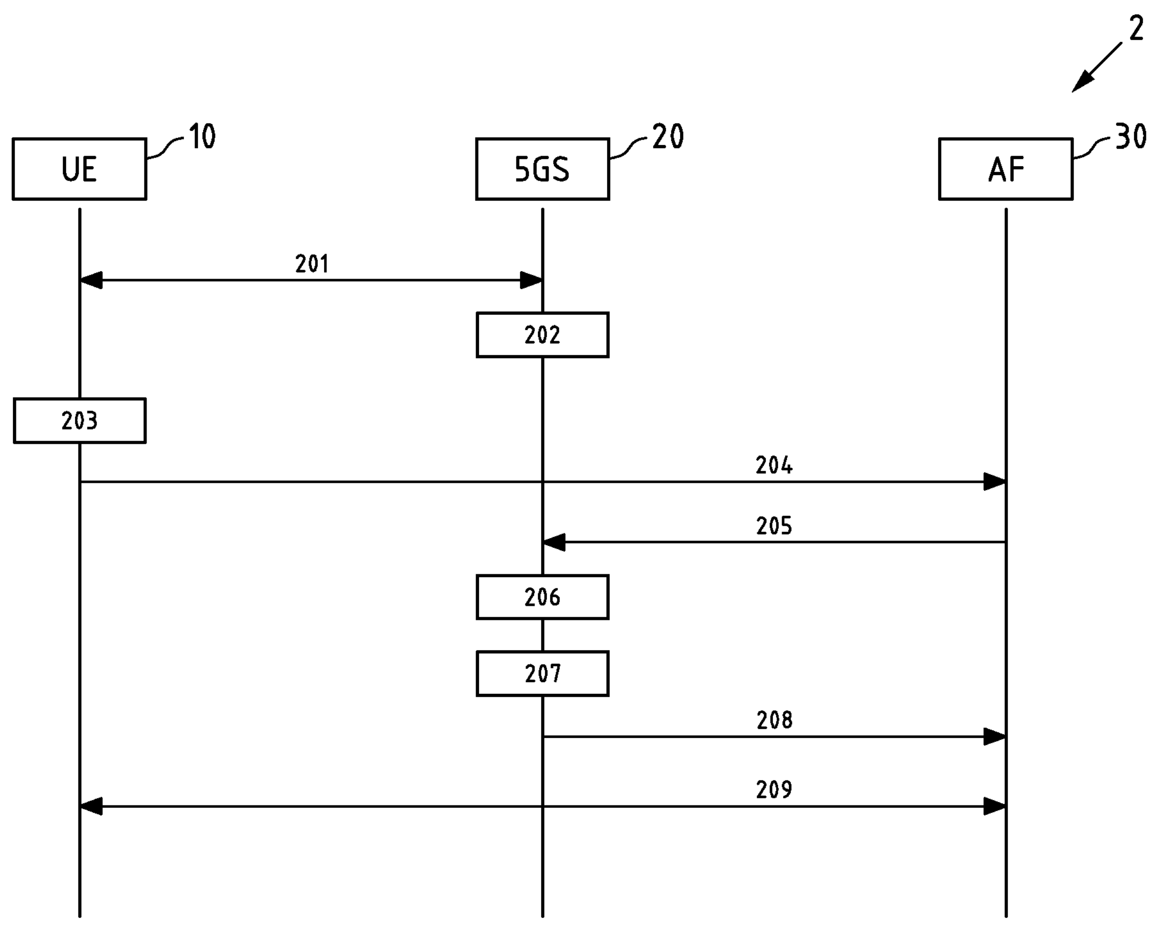
FIG. 2 an AKMA process defined in 3GPP TS 33.535, parts of which may be used in various embodiments.

FIG. 2 illustrates an AKMA process 2 defined in 3GPP TS 33.535, parts of which may be used in various embodiments. The process may involve three entities, the UE 10, the 5G system (5GS) 20 and the AF 30. The entities may correspond to those shown in FIG. 1, wherein the 5GS 20 is a non-limiting example of a cellular network 20.

Step 201 may comprise that the UE 10 and 5GS 20 execute primary authentication. The primary authentication may involve that functions of the 5GS 20 exchange messages. For example, the AUSF of the 5GS 20 may interact with the UDM 22 of the 5GS 20 to fetch authentication information.

Step 201 may further comprise establishing, at least part of, a key hierarchy which may, e.g., in-dude the key $K_{AUSF}$.

Figure 3:
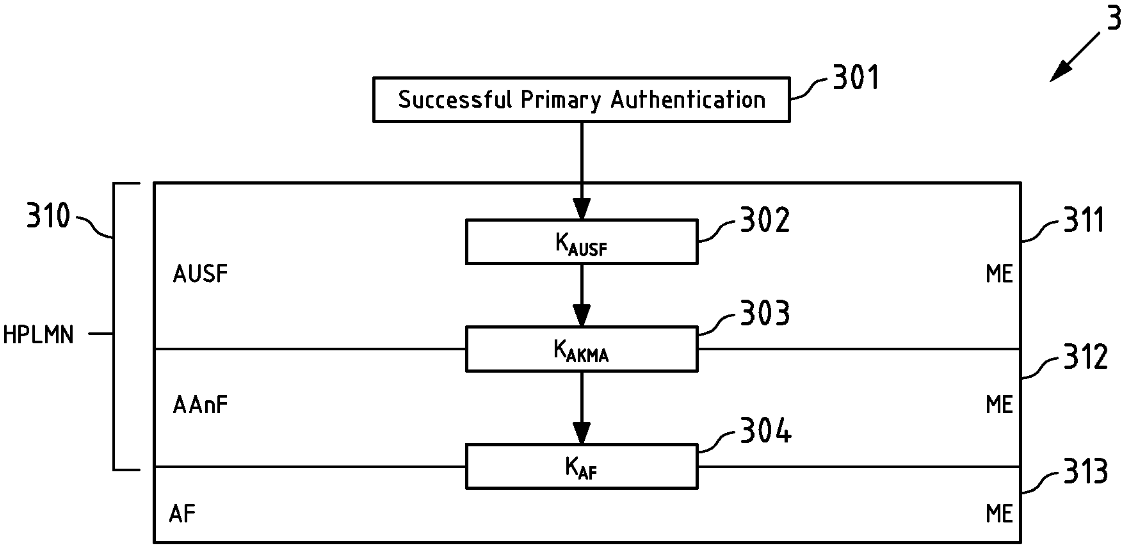
FIG. 3 an example key hierarchy as described in 3GPP TS 33.535 and as may be used in various example embodiments.

FIG. 3 shows an example key hierarchy 3 as described in 3GPP TS 33.535 and as may be used in various example embodiments. It is to be understood that FIG. 3 is intended to give a complete overview of the key hierarchy, especially of the dependencies of the keys on each other. Thus, while FIG. 3 is described in the context of step 201, it is not to be understood in such a way that all keys shown in FIG. 3 need necessarily to be generated at the same time, essentially the same time and/or within step 201. For example, $K_{AF}$ may be generated at step 207, e.g., at the network side. The key hierarchy may include at least one (but possibly all) of the following keys: $K_{AUSF}$ 302, $K_{AKMA}$ 303, $K_{AF}$ 304.

$K_{AUSF}$ 302 may be established between the UE 10 and the 5GS 20 resulting from the successful primary authentication procedure 201, 301. The $K_{AUSF}$ 302 may be securely stored in the AUSF based on the home operator's policy on using such key.

$K_{AKMA}$ 303 may be a key for AAnF 312. It may be derived by at least one of ME or AUSF 311 from $K_{AUSF}$ 302.

$K_{AF}$ may be a key derived by at least one of ME or AAnF 312. It may be for AF 313.

It is to be understood that the AUSF 311 and the AAnF 312 referred to in the context of FIG. 3 relate to a same HPLMN.

Step 202 may comprise that the 5GS 20, (e.g., directly) after primary authentication executes AKMA key derivation and/or uses $K_{AUSF}$ to calculate $K_{AKMA}$, and/or A-KID.

A-KID may be an identifier in format username@realm. Username may include a RID (routing indicator) and a A-TID (AKMA temporary ID), realm may comprise the HN identifier. A-TID may be identifying within the HN the UE 10 and its AKMA key.

A-TID may be calculated using a cryptographic one-way function (called KDF) with the UE's 10 SUPI and $K_{AUSF}$ as input parameters. For example, when deriving the A-TID from $K_{AUSF}$, the following parameters may be used to form the input S to the KDF:

FC=0x81;

P0="A-TID";

L0=length of "A-TID"; (i.e. 0x00 0x05)

P1=SUPI;

L1=length of SUPI.

The input key KEY may be $K_{AUSF}$.

SUPI may have the same value as parameter P0 in Annex A.7.0 of TS 33.501 V17.6.0 Release 17.

The results and the corresponding SUPI may be stored in a database using A-KID as a key. Depending on the implementation also A-TID might be used as a key identifier instead of A-KID.

For example after AKMA key material is generated, AUSF may select the AAnF and/or send generated A-KID, $K_{AKMA}$ and/or/along with SUPI, e.g., to the AAnF. The AAnF may store the latest information (e.g., the received A-KID, $K_{AKMA}$ and/or/along with SUPI) in AKMA UE context.

Step 203 may comprise that the UE 10 initiates the AKMA procedure and/or uses $K_{AUSF}$ to calculate $K_{AKMA}$ and/or A-KID using the same algorithms as the 5GS 20. In addition the UE 10 may calculate $K_{AF}$ using $K_{AKMA}$ and AF_ID as input. The AF_ID may be the concatenation of the Fully Qualified Domain Name (FQDN) of the AF 30 and of a (e.g., Ua* security) protocol identifier.

Step 204 may comprise that the UE 10 sends a session establishment request to the AF 30. The session establishment request may comprise the A-KID. Since the A-KID may be structured so that it does not contain the identity of the UE 10 in plain text, the privacy of the UE 10 may be protected.

Step 205 may comprise that the AF 30 sends a AKMA_AFKey_Request, e.g., a request for an application key $K_{AF}$, to the NEF 23 of the 5GS 20. The request may comprise the A-KID and the AF_ID.

Step 206 may comprise that the 5GS 20 authorizes the request. For example the 5GS may check that the AF 30 is allowed to make requests for the provided AF_ID.

Step 207 may comprise that the 5GS 20 uses A-KID (or, additionally or alternatively, depending on implementation, A-TID) as a search key and fetches the $K_{AKMA}$ computed in step 202 and/or the SUPI from the database. The 5GS 20 may calculate $K_{AF}$ using $K_{AKMA}$ and AF_ID as input.

Step 208 may comprise that the 5GS 20 returns the $K_{AF}$ (and, e.g., $K_{AF}$ expiry time) together with the GPSI to the AF 30.

The GPSI may be returned because the SUPI may be intended for usage only within the 5GS 20. In this example an external AF 30 is assumed so that the GPSI is returned. If the AF 30 was an internal AF, it might get the SUPI. In some scenarios like anonymous user access cases, the UE identity may not be required at the AF. So in various scenarios, SUPI may not be shared by AAnF to AF.

At the time step 209 is performed, the AF 30 may know the identity of the UE 10. Additionally or alternatively, the UE 10 and the AF 30 may have a shared secret, i.e., $K_{AF}$. In such a case, step 209 may comprise that AF 30 and UE 10 continue with the session establishment, e.g., based on $K_{AF}$.

It can be observed that the current specification of AKMA, e.g., 3GPP TS 33.535 V17.6.0 Release 17 specifies that requests of AFs 30 shall be authorized. However, the specification leaves it open how to create mutually trusted certificates, and what policies to apply to authorize AF 30 requests.

An AF 30 acting as a client at the NEF 23 may have a certificate from a CA that belongs to the generally trusted CAs for web servers that are pre-configured in web browsers. However, in various scenarios the MNO may not be able to evaluate the trustworthiness of all these CAs.

In the following, various embodiments of the methods according to the first, second, third and fourth example aspect are described with regard to flowcharts. The steps shown in these flowcharts may be performed after and/or based on steps relating to primary authentication and/or key derivation have been performed, for example steps 201 to 203 described with respect to FIG. 2.

Figure 4:
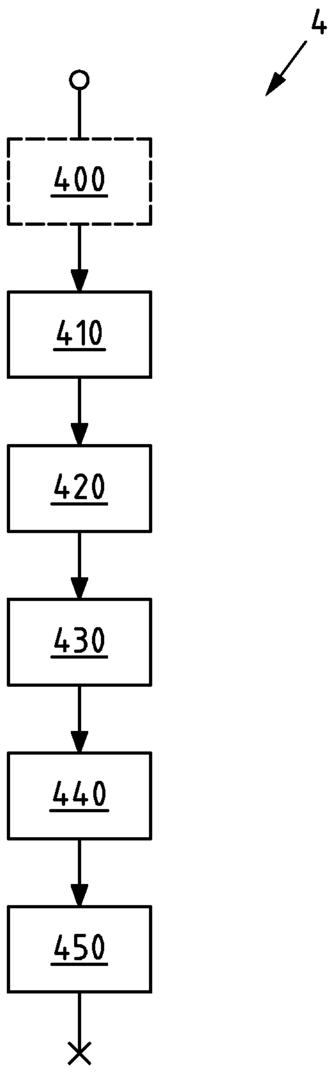
FIG. 4 a flowchart showing an example embodiment of a method according to the first example aspect.

FIG. 4 shows a flowchart 4 showing an example embodiment of a method according to the first example aspect. One or more steps described in the following may be performed and/or controlled by an apparatus and/or a system. The apparatus or the system may be configured for and/or operate as at least part of an AF 30.

In various embodiments, especially those that comprise "option A" described before, step 400 comprises carrying out a process of registering the AF 30 with the cellular network 20, wherein a certificate is assigned to the AF 30 by the cellular network 20. However, other embodiments are possible where step 400 is not present.

As compared to the 3GPP TS 33.535 V17.6.0 Release 17, a new interface (also referred to as "new interface 1" hereafter) may be provided by the cellular network 20 that can be used by new AFs 30 to register with the cellular network 20. In this process, the AF 30 may provide a public key and may prove possession of the respective private key. The cellular system may assign a so called client ID to the AF 30 and provide a certificate (operator-AF-certificate) that relates the public key to the client ID. The operator-AF-certificate may be signed in a way that it can be verified based on the operator CA.

The interface may be provided by a registration authority (RA) that is part of the operator PKI. The PKI may do the book-keeping for the assigned client IDs. It may perform regular PKI tasks related to the operator-AF-certificates like providing a revocation mechanism.

The cellular network 20 may or may not verify the AF 30 identity. In some embodiments, the cellular network 20 may simply assign a unique client ID and create a certificate. Some general IT security measurements may still be used to prevent abuse of the interface, e.g. a mitigation against flooding attacks.

Step 410 comprises receiving, from a user device (e.g., an UE 10), an application session establishment request comprising a key identifier (e.g., an AKMA key identifier A-KID) relating to the user device.

Step 420 comprises establishing an encrypted session (e.g., a TLS session) with a network node (e.g., operating as a NEF 23) of a cellular network 20 based on the certificate. In some embodiments the certificate may have been assigned as described in step 400. In other embodiments the certificate may have been assigned otherwise.

In various embodiments, especially those comprising "option B", the certificate may be associated with an identifier assigned to the AF, e.g., the client identifier assigned in step 400.

Step 430 comprises transmitting a request for an application key (e.g., AKMA application key $K_{AF}$) to the network node using the encrypted session, wherein the request comprises the key identifier (e.g., the AKMA key identifier A-KID) relating to the user device and an application function identifier AF_ID. The request may be an Nnef_AKMA_ApplicationKey_Get.

Step 440 comprises receiving at least one response to the request for the application key, wherein the at least one response is from a set of possible responses comprising at least a rejection and a message comprising the application key and a user device identifier, and wherein the at least one response depends at least partly on the certificate. The response may be an Nnef_AKMA_ApplicationKey_GetResponse.

The dependence on the certificate may take various forms.

In various embodiments, especially those comprising "option A", the at least one response may depend at least partly on the certificate in that the at least one response depends at least partly on an authentication of the AF based on the certificate.

Additionally or alternatively, in various embodiments, especially those comprising "option B", the at least one response may depend at least partly on the certificate in that the at least one response depends at least partly on a configurable setting stored by a network node (e.g., operating as at least part of a UDM) of the cellular network 20, the configurable setting indicating whether the AF to which the identifier associated with the certificate is assigned is authorized to receive the message comprising the application key $K_{AF}$ and the user device identifier.

Step 450 comprises transmitting, to the user device, an application session establishment response, wherein the application session establishment response is based on the received at least one response.

Figure 5:
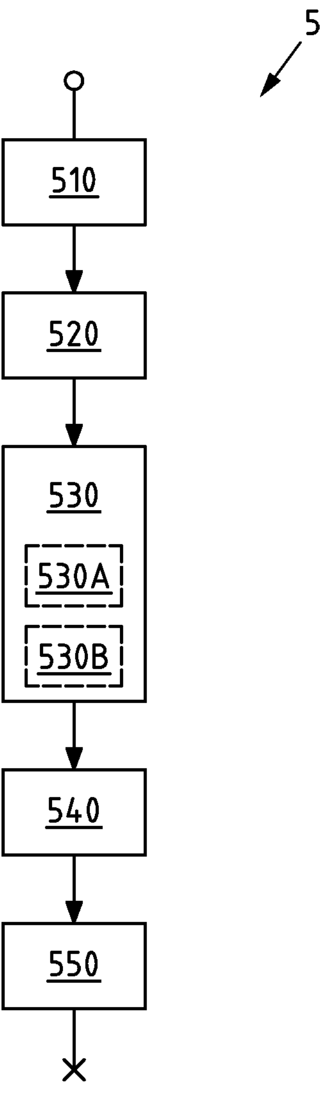
FIG. 5 a flowchart showing an example embodiment of a method according to the second example aspect.

FIG. 5 shows a flowchart 5 showing an example embodiment of a method according to the second example aspect One or more steps described in the following may be performed and/or controlled by an apparatus, e.g., a network node, or a system. The apparatus or system may be configured for and/or operate as at least part of an NEF 23.

Step 510 comprises establishing an encrypted session (e.g., a TLS session) with an AF 30 based on a certificate.

As described above with respect to step 420, in various embodiments (especially those comprising "option B") the certificate may be associated with an identifier assigned to the AF, e.g., the client ID.

Step 520 comprises receiving a request for an application key (e.g., AKMA application key $K_{AF}$) from the AF 30 using the encrypted session. The request may be configured as described with respect to step 430.

Step 530 comprises determining at least one response to the request for the application key from a set of possible responses, the set comprising at least a rejection and a message comprising the application key and a user device identifier.

In various embodiments (especially those comprising "option A"), step 530 comprises step 530A. Step 530A comprises authenticating the AF 30 based on the certificate, the certificate having been assigned to the AF 30 by the cellular network 20 in a process of registering the AF 30 with the cellular network 20 (e.g., as described with respect to step 400).

Additionally or alternatively, in various embodiments (especially those comprising "option B"), step 530 comprises step 530B.

Step 530B comprises determining the identifier, e.g., the client ID, associated with the certificate. Step 530B further comprises determining, based on the identifier associated with the certificate, whether the AF 30 is authorized to receive the message comprising the application key and the user device identifier, wherein the determining is based on a configurable setting stored by a network node of the cellular network 20 that indicates whether the AF 30 to which the identifier associated with the certificate is assigned is authorized to receive the message comprising the application key $K_{AF}$ and the user device identifier.

As compared to the 3GPP TS 33.535 V17.6.0 Release 17, a new interface (also referred to as "new interface 2" hereafter) may be provided by which the subscriber can configure in the cellular network 20 the client IDs of AFs 30 that the subscriber authorizes to make requests for an application key. For one or more subscriptions, the cellular network 20 may store the list of these allowed client IDs (e.g., as part of a method according to the third example aspect). In case of enterprise cases, enterprise configure may allow AFs 30 to each of their subscriber.

As to the interface, by way of example an operator may provide a subscriber self-management portal providing a secure way for subscribers to manage certain aspects of their (e.g., respective) subscriptions. This portal may offer the feature to configure one or more client IDs of one or more respective authorized AFs 30. The client IDs of respective authorized AFs 30 for a subscription can be maintained in the UDM, e.g., as part of the subscription data.

In various scenarios, the subscriber may need to know the client IDs of the respective AFs 30 the subscriber wants to authorize. It is assumed that the subscriber may learn these, e.g., together with the FQDNs of the respective AFs 30. In various scenarios, the subscriber may also need to know the FQDN for being able to initiate a session with the AF 30. Thus, for example, at least one of FQDN or client ID may be accessible by a subscriber, e.g., because they are available on a public website, e.g., of the operator of the AF 30. FQDN and/or client ID may additionally or alternatively be included in an app, e.g., an app that the subscriber installs on the UE 10. In the PIN use case as described above, the subscriber may be the PO, and may be at the same time the owner of the AF (the PO's AAA server). In such a scenario, the subscriber may have knowledge of the client ID.

In various embodiments, the subscriber can use the configuring to not only configure a client ID, but also a list of one or several AF_IDs associated with the client ID (and, e.g., this subscriber). In this way, the subscriber can restrict the authorization for a client ID further to one or more AF_IDs. Alternatively, enterprise can also configure the same for each of their user/subscriber.

Step 540 comprises transmitting the at least one response to the request for the application key to the AF. The response may be configured as described with respect to step 440.

In various embodiments, for example if authentication and/or authorization fails, the request for the application key may be rejected.

Figure 6:
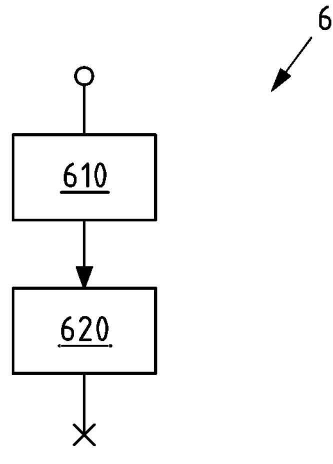
FIG. 6 a flowchart showing an example embodiment of a method according to the third example aspect.

FIG. 6 shows a flowchart showing an example embodiment of a method according to the third example aspect One or more steps described in the following may be performed and/or controlled by an apparatus, e.g., a network node, or a system. The apparatus or the system may be configured for and/or operate as at least part of an UDM 22.

Step 610 comprises storing or retrieving a configurable setting, the configurable setting indicating whether an AF 30 to which an identifier associated with a certificate is assigned is authorized to receive a message comprising an application key $K_{AF}$ and a user device identifier in response to a request for an application key $K_{AF}$, the request comprising a key identifier A-KID relating to a user device and an application function identifier AF_ID.

The request comprising the key identifier A-KID relating to a user device and an application function identifier AF_ID may be understood to be an request from, e.g., an AF 30 to, e.g., an NEF 23 or AAnF 21. In various embodiments, it may be that UDM 22 does not store, receive or get the A-KID and/or A-KID level details.

The configurable setting may, e.g., correspond to or comprise a list, e.g., for a subscriber. A subscriber may be associated with a user device. The list may comprise respective indications for one or more AFs 30 which are authorized to receive a message comprising an application key $K_{AF}$ and a user device identifier in response to a request for an application key $K_{AF}$. At least parts of the configurable setting may be configured by a subscriber, as described above in the context of step 530B.

Step 620 comprises interacting with another network node of the cellular network 20 to provide, to the other network node, based on the configurable setting, information indicating whether the AF 30 is authorized to receive the message comprising the application key $K_{AF}$ and the user device identifier.

Figure 7:
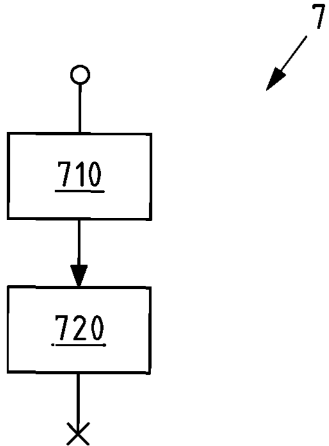
FIG. 7 a flowchart showing an example embodiment of a method according to the fourth example aspect.

FIG. 7 shows a flowchart showing an example embodiment of a method according to the fourth example aspect. One or more steps described in the following may be performed and/or controlled by an apparatus, e.g., a network node, or a system. The apparatus may be configured for and/or operate as a user device, e.g., a UE 10.

Step 710 comprises transmitting, to an AF 30, an application session establishment request comprising a key identifier (A-KID) relating to the user device. The step may correspond to step 410 in FIG. 4.

Step 720 comprises receiving, from the application function, an application session establishment response. The step may correspond to step 450. Accordingly, the application session establishment response may be based on at least one response to a request from the application function to a network node of a cellular network 20 for an application key $K_{AF}$, as described in more detail with regard to FIGS. 4-6.

Figure 8:
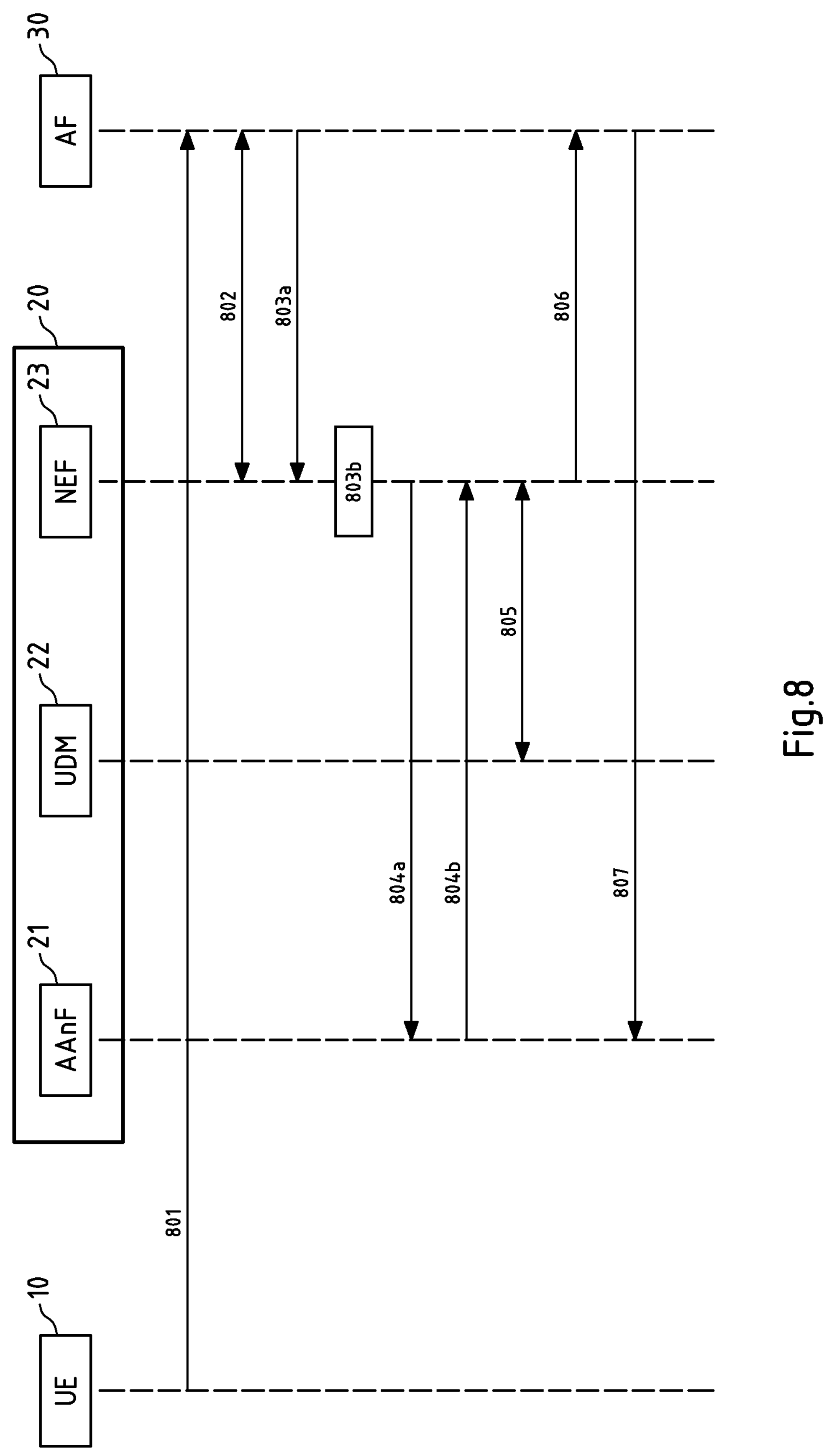
FIG. 8 a signaling flowchart of an example embodiment according to all example aspects.

FIGS. 4 to 7 have illustrated example embodiments of a respective method according to one of the example aspects. FIG. 8 shows a signaling flowchart of an example embodiment according to all example aspects.

FIG. 8 shows a UE 10 that, by way of example, may also act as a PEGC. FIG. 8 further shows a cellular network 20, e.g., a 5GS, that comprises an AAnF 21, a UDM 22, and a NEF 23. Additionally, FIG. 8 shows an AF 30 that may also act as an AAA server. The entities may perform steps and exchange messages as described in the following.

Step 801 may comprise that the UE (PEGC) 10 initiates a session to the AF (AAA server) 30 and provides the A-KID. The message may be called an application session establishment request comprising A-KID. Step 801 may be considered to be an example of steps 410, 710 described above.

Step 802 may comprise that the AF 30 establishes a TLS session with the NEF 23. As the TLS client certificate, it may use the operator-AF-certificate (that may have been obtained by the AF 30, e.g., in a process of registering the AF 30 with the cellular network 20). Step 802 may be considered to be an example of steps 420, 510 described above.

Step 803$a$ may comprise that the AF 30 calls the NEF 23 API to get the key $K_{AF}$. It may pass the A-KID, and the AF_ID. The calling of the NEF 23 API may be done by transmitting a Nnef_AKMA_ApplicationKey_Get. Step 803$a$ may be considered to be an example of steps 430, 520 described above.

Step 803*b* may comprise that the NEF 23 learns the client ID from the TLS client certificate used by the AF 30 and/or verifies the client ID (e.g., performs an authentication of the AF 30).

In various embodiments, AF 30 can receive an error, e.g., if in step 803*b* authentication and/or validation fails at the NEF (or, e.g., at the AAnF).

Steps 804*a* and 804*b* may comprise that the NEF 23 interacts with the AAnF 21 to retrieve $K_{AF}$ and SUPI. In step 804*a* Naanf_AKMA_AFKey_Request may be transmitted from the NEF 23 to the AAnF 21 and at least one of the parameters A-KID or AF_ID may be passed from the NEF 23 to the AAnF 21. In step 804*b* a Nanf_AKMA_ApplicationKey_GetResponse may be transmitted from the AAnF 21 to the NEF 23 and at least one of the parameters $K_{AF}$, $K_{AF}$ exptime, or SUPI may be passed from the AAnF 21 to the NEF 23.

Step 805 may comprise that the NEF 23 checks with the UDM 22 whether the client ID is configured as authorized client ID. The request sent to the UDM 22 may include at least the SUPI. The UDM 22 may use the SUPI to verify that the provided client ID has been configured in the subscription data.

In various embodiments, the request may also include the AF_ID obtained in step 803*a*. In this case the UDM 22 may use the provided AF_ID for the authorization decision as well. In an embodiment the UDM 22 might authorize the request, if either the subscription data contain an entry for the combination of provided client ID and AF_ID, or if the subscription data contain an entry for the provided client ID and no AF_ID for this client ID.

Additionally or alternatively, AF_ID verification can also be performed at the AAnF 21, i.e., AAnF may retrieve UDM 22 data and verify if AF_ID is allowed (e.g., authorized) for the given subscriber or not.

Step 805 may be considered to be an example of step 620 described above. Moreover, at least one (but possibly all) of steps 803*b*, 804*a*, and 805 may be considered to be example parts of step 530 described above.

Step 806 may comprise that the NEF 23 provides $K_{AF}$ and GPSI to the AF 30 (e.g., under the condition that the AF 30 has been successfully authorized). After this step, $K_{AF}$ may be a key shared between UE 10 and AF 30 (because the UE 10 can also derive $K_{AF}$) and can be used for mutual authentication and security establishment between UE 10 and AF 30. Step 806 may be an example of steps 540, 440 described above.

Step 807 may comprise that the AF 30 sends to the UE 10 the answer on the UE's 10 session request.

Overall, various embodiments may be summarized as follows. AF 30 may be requesting a $K_{AF}$ using the NEF 23 API and passing the A-KID and the AF_ID. The AF 30 may be authenticated by the NEF 23 based on the operator-AF-certificate and proof of possession of the respective private key. In this way the NEF 23 may learn the client Id of the of the AF 30. Further, the cellular network 20, e.g., 5GS, may verify that the client ID is among the client IDs authorized by the subscriber for receiving a $K_{AF}$. Only in this case $K_{AF}$ and GPSI are returned. Otherwise, the request is rejected without revealing the GPSI belonging to the A-KID.

Various embodiments may be used in the context of the PIN use case described above with respect to FIG. 1. For example, the shared key $K_{AF}$ may be used to setup security for a protocol (e.g., RADIUS or Diameter) between the UE/PEGC 10 and the AAA server 30. The secure connection can then be used to transmit, e.g., EAP messages between the PEGC 10 (e.g., acting as the EAP-authenticator for PEs 11, 12) and the AAA server 30 (e.g., acting as EAP-server). The connection may allow to securely transmit the MSK resulting from a successful authentication from the AAA server 30 to the PEGC. 10 Based on the MSK, security can be established between PE 11, 12 and PEGC 10. In particular, when the PIN uses WiFi, security can be established using Enterprise WiFi Protected Access.

In the following, various variants to the embodiment described with respect to FIG. 8 will be described.

The first variant relates to the two options "option A" and "option B" referred to before.

Regarding the embodiment described with respect to FIG. 8, a method comprising "option A" may be understood as a method to establish a client certificate for the AF 30 that can be used by the NEF 23 to authenticate the AF 30. One or more steps for registering an AF 30 with a cellular network 20, as for example described with respect to step 400 and/or "new interface 1", may be carried out. In contrast, if steps relating to "option B" are not part of the embodiment, one or more steps for configuring client IDs of AFs 30 that the subscriber may authorize to make requests for an application, as for example described with respect to "new interface 2", may be omitted. Furthermore, step 805 (and/or steps 620, 530B) may be omitted. In this variant the NEF 23 can authenticate the AF 30 based on the operator-AF-certificate.

Regarding the embodiment described with respect to FIG. 8, a method comprising "option B" may be understood as a method ensuring user consent to requests for the $K_{AF}$, e.g., putting the subscriber in control to authorize AFs 30. For example, when steps relating to "option A" are not part of the embodiment, one or more steps relating to the registering of an AF 30 with a cellular network 20, as for example described with respect to step 400 and/or "new interface 1", may be omitted. Accordingly, in steps relating to configuring AFs 30 that the subscriber authorizes to make requests for a $K_{AF}$ (as for example described with respect to "new interface 2") and/or steps relating to checking the authorization of AFs 30 (e.g., steps 805, 530, 620), instead of the client ID, the AF_ID may be used, e.g., as the identifier assigned to the AF 30. Assuming the AF 30 has been authenticated to legally use the AF_ID, e.g., by means of a trustworthy client certificate (e.g., from a third-party CA), it may be ensured that only AFs 30 authorized by the subscriber will be able to get the application key $K_{AF}$ and a user device identifier, e.g., a GPSI.

While the two options are particularly useful when applied together, it is also possible to apply only one of them to achieve an increase in security.

Another variant of the embodiment described with respect to FIG. 8 may relate to multiple AF_IDs for a given client ID.

In this variant, during client registration (e.g., as described with respect to step 400 and/or the "new interface 1") the owner of the AF 30 (and subsequently owner of the client ID) might also configure further AF_IDs associated with the client ID. If the subscription data of a UE 10 comprises a client ID, but no configured AF_IDs for this client ID, the information to be configured on the UE 10 may comprise or consist of the AF_IDs associated with the client ID.

The availability of AFs 30 can be configured to the UE 10, e.g., after the UE 10 has attached to the network 20. Existing mechanisms, like UE Configuration Update, can be reused for this purpose. The information to be configured on the UE 10 may comprise or consist of one or more or all AF_IDs which have been added to the UE's 10 subscription data in a step of configuring AFs 30 that the subscriber authorizes to make requests for a $K_{AF}$ (as for example described with respect to "new interface 2").

The advantage of this variant may be that, in various scenarios, the UE 10 may learn the FQDN (which may be part of the AF_ID) that it should use and/or in case it learned the FQDN by some other means may know that usage of this AF_ID has been authorized by the subscription owner.

Another variant of the embodiment described with respect to FIG. 8 may relate to a trusted AF 30 scenario.

In this variant, if AF 30 is within the boundary of the operator domain (e.g., internal to the cellular network 20), then AF 30 can directly contact the AAnF 21 without NEF 23. In this case, AAnF 21 may learn the client ID from the TLS client certificate used by the AF 30. Further, it may verify the AF_ID stored in the UDM 22 for the given subscriber.

Yet another variant of the embodiment described with respect to FIG. 8 may relate to an OAuth authorization token.

In this variant, an OAuth mechanism may be used for the authorization of the NEF 23 interface. Specifically, prior to step 802 in FIG. 8, the AF 30 may request and receive a token from an authorization server (not shown in the signalling diagram in FIG. 8). The AF 30 may use its client certificate to authenticate itself to the authorization server in this step. Furthermore, the request in step 803*a* may comprise this token. In step 803*b* the NEF 23 might learn the identity (of the AF 30) from the provided token instead of from the client certificate.

In summary, various embodiments allow to establish a certificate (e.g., a TLS client certificate) that can be used by a cellular network 20 (e.g., a NEF 23 of that network, e.g., a 5GS) to authenticate an external AF 30 that requests a $K_{AF}$ according to AKMA. Moreover, various embodiments may reduce the need for the operator to rely on external CAs and/or perform offline procedures to assure the identity of an AF 30. Further, in various embodiments the subscriber may be enabled to specify which AFs 30 the subscriber trusts to receive a $K_{AF}$. Various embodiments may help to ensure that only AFs 30 trusted by the subscriber will be able to retrieve a $K_{AF}$ and an identifier (e.g., GPSI) for a user device, e.g., a UE 10. This way, various embodiments may contribute to pre-venting rogue AFs 30 from gathering user device identifiers (e.g., GPSIs) and/or from getting knowledge that a UE 10 with a certain user device identifier (e.g., GPSI) tries to access a certain AF 30, both of which is possible with AKMA as specified in the current version 3GPP TS 33.535 V17.6.0 Release 17.

Moreover, for the PIN use case described with respect to FIG. 1, various embodiments may provide a convenient way to establish a secure connection between PEGC 10 and AAA server 30, e.g., under full control of the PO and/or preserving the privacy of the PO. Thus, these various embodiments may contribute to enabling a PIN deployment with centralized AAA server 30, as may be particularly useful for a complex PIN comprising multiple PEGCs 10 and large numbers of PEs 11, 12.

Figure 9:
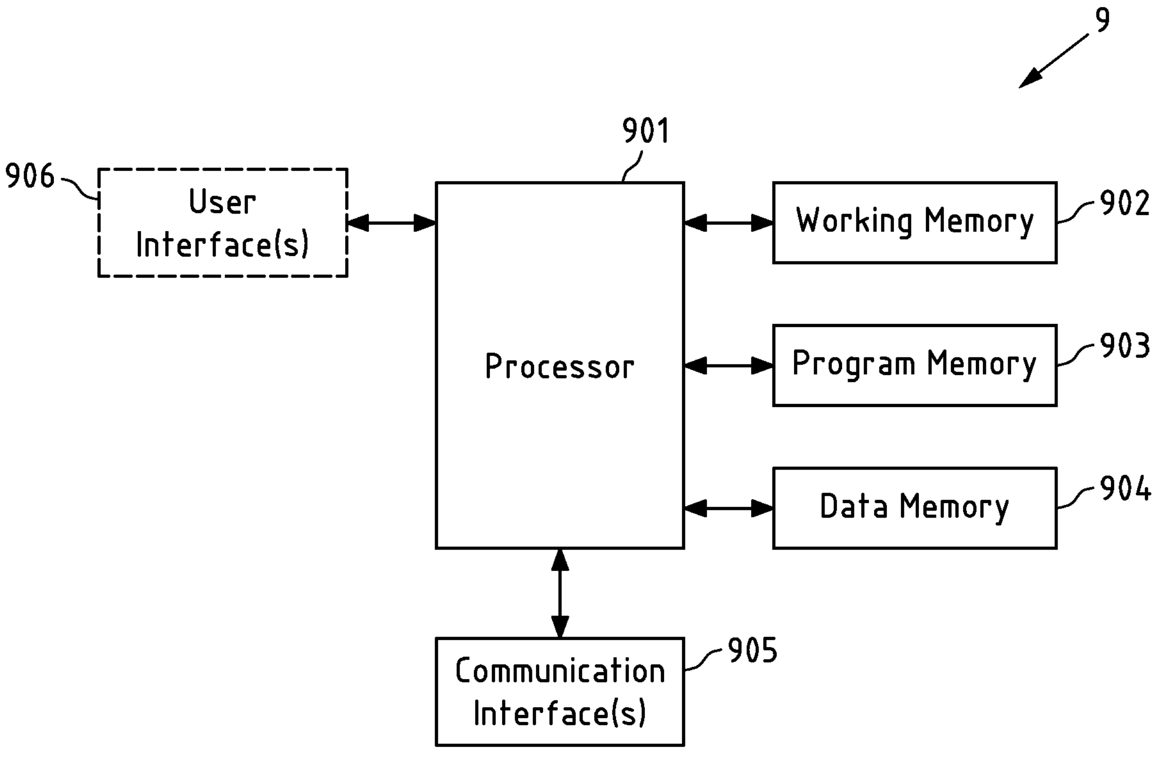
FIG. 9 a schematic block diagram of an apparatus configured to cause performing the method according to the first, second, third or fourth example aspect.

FIG. 9 is a schematic block diagram of an apparatus 9 configured to cause performing the method according to the first, second, third or fourth example aspect and/or any one the embodiments and variants thereof described above.

Apparatus 9 comprises a processor 901, a working memory 902, a program memory 903, a data memory 904, and communication interface(s) 905. In various embodiments, the apparatus 9 comprises further units, parts or structural and/or functional elements. In various embodiments, apparatus 9 is a network node or user device (e.g., user equipment), e.g., for use in a cellular network 20 like 5G.

The apparatus 9 may be configured to cause operation of at least part of at least one function with regard to cellular network 20, e.g., an AF 30, an NEF 23, a UDM 22, an AAnF 21, or any other function.

Apparatus 9 may for instance be configured to perform and/or control or comprise respective means (at least one of 901 to 906) for performing and/or controlling and/or configured to perform the method according to the first, second, third, or fourth example aspect Apparatus 9 may as well constitute an apparatus comprising at least one processor 901 and at least one memory 902, 903, 904 including computer program code, the at least one memory 902, 903, 904 and the computer program code configured to, with the at least one processor 901, cause an apparatus, e.g. apparatus 9 at least to perform and/or control the method according to the first, second, third, or fourth example aspect Additionally or alternatively, apparatus 9 may comprise at least one processor 901 and at least one memory 902, 903, 904 storing instructions that, when executed by the at least one processor 901, cause the apparatus at least to perform the method according to the first, second, third, or fourth example aspect.

Processor 901 may for instance control the memories 902 to 904, and/or the communication interface (s) 905.

Processor 901 may for instance execute computer program code stored in program memory 903, which may for instance represent a computer readable storage medium comprising program code that, when executed by processor 901, causes the processor 901 to perform the method according to the first, second, third, or fourth example aspect.

Processor 901 (and also any other processor mentioned in this specification) may be a processor of any suitable type. Processor 901 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 901 may for instance be an application processor that runs an operating system.

Program memory 903 may also be included into processor 901. This memory may for instance be fixedly connected to processor 901, or be at least partially removable from processor 901, for instance in the form of a memory card or stick. Program memory 903 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 903 may also comprise an operating system for processor 901. Program memory 903 may also comprise a firmware for apparatus 9.

Apparatus 9 may comprise a working memory 902, for instance in the form of a volatile memory. It may for instance be a Random Access Memory (RAM) or Dynamic RAM (DRAM), to give but a few non-limiting examples. It may for instance be used by processor 901 when executing an operating system and/or computer program.

Data memory 904 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 905 enable apparatus 9 to communicate with other entities, e.g. with one or more of the entities 10, 11, 12, 20, 21, 22, 23, 30 of FIGS. 1, 2 and/or 8 and/or network nodes, e.g. of the same network. The communication interface(s) 905 may for instance comprise a wireless interface, e.g. a cellular radio communication interface and/or a WLAN interface and/or wire-bound interface, e.g. an IP-based interface, for instance to communicate with entities via the Internet or a network backbone, e.g. a 5G backbone.

User interface 906 is optional and may comprise a display for displaying information to a user and/or an input device (e.g. a keyboard, keypad, touchpad, mouse, etc.) for receiving information from a user. User interface 906 may for example be present in a user device.

Some or all of the components of the apparatus 9 may for instance be connected via a bus. Some or all of the components of the apparatus 9 may for instance be combined into one or more mod-ules.

Finally, the following embodiments are disclosed:

Embodiment 1

A method, e.g. performed by an apparatus or a system, e.g. operating as at least part of an application function, the method comprising:

receiving, from a user device, an application session establishment request comprising a key identifier relating to the user device;

establishing an encrypted session with a network node of a cellular network based on a certificate;

transmitting a request for an application key to the network node using the encrypted session, wherein the request comprises the key identifier relating to the user device and an application function identifier;

receiving at least one response to the request for the application key, wherein the at least one response is from a set of possible responses comprising at least a rejection and a message comprising the application key and a user device identifier, and wherein the at least one response depends at least partly on the certificate; and transmitting, to the user device, an application session establishment response, wherein the application session establishment response is based on the received at least one response;

wherein the method further comprises at least one of option A or B, wherein according to option A, the certificate is assigned to the application function by the cellular network in a process of registering the application function with the cellular network, and the at least one response depends at least partly on the certificate in that the at least one response depends at least partly on an authentication of the application function based on the certificate; or wherein according to option B, the certificate is associated with an identifier assigned to the application function, and wherein the at least one response depends at least partly on the certificate in that the at least one response depends at least partly on a configurable setting stored by a network node of the cellular network, the configurable setting indicating whether the application function to which the identifier associated with the certificate is assigned is authorized to receive the message comprising the application key and the user device identifier.

Embodiment 2

The method of embodiment 1, wherein the identifier that is assigned to the application function and that is associated with the certificate consists of or comprises a client identifier that was assigned to the application function by the cellular network.

Embodiment 3

The method of embodiment 2, wherein the client identifier is assigned to the application function in the process for registering the application function with the cellular network.

Embodiment 4

The method of any one of embodiments 1 to 3, wherein the identifier that is assigned to the application function and that is associated with the certificate consists of or comprises the application function identifier.

Embodiment 5

The method of any one of embodiments 1 to 4, wherein the network node to which the request for the application key is transmitted operates as at least part of a network exposure function, NEF, of the cellular network, and wherein the application function is external to the cellular network.

Embodiment 6

The method of any one of embodiments 1 to 4, wherein the network node to which the request for the application key is transmitted operates as at least part of an authentication and key management for applications anchor function of the cellular network, and wherein the application function is internal to the cellular network.

Embodiment 7

The method of any one of embodiments 1 to 6, wherein the certificate is associated with the identifier assigned to the application function by means of a token, wherein the request for the application key ($K_{AF}$) to the network node further comprises the token, and wherein the token forms a basis for the network node to determine the identifier that is assigned to the application function and associated with the certificate, and wherein the method further comprises:

requesting the token from an authorization server based on the certificate; and receiving the token from the authorization server.

Embodiment 8

The method of any one of embodiments 1 to 7, the method further comprising:

operating as at least part of an authentication, authorization and accounting server for a network different from the cellular network, the network comprising the user device and comprising at least one apparatus without the capability to connect to the cellular network.

Embodiment 9

The method of any one of embodiments 1 to 8, wherein the apparatus comprises the application function, is the application function, or is comprised in the application function.

Embodiment 10

A method, e.g. performed by a network node, e.g. operating as at least part of a function in a cellular network, the method comprising:

establishing an encrypted session with an application function based on a certificate;

receiving a request for an application key from the application function using the encrypted session, wherein the request comprises a key identifier relating to a user device and an application function identifier;

determining at least one response to the request for the application key from a set of possible responses, the set comprising at least a rejection and a message comprising the application key and a user device identifier;

transmitting the at least one response to the request for the application key to the application function, wherein the method further comprises at least one of option A or B, wherein according to option A, the certificate is assigned to the application function by the cellular network in a process of registering the application function with the cellular network, and the determining of the at least one response to the request comprises authenticating the application function based on the certificate; or wherein according to option B, the certificate is associated with an identifier assigned to the application function, and wherein the determining of the at least one response to the request comprises determining the identifier associated with the certificate and determining, based on the identifier associated with the certificate, whether the application function is authorized to receive the message comprising the application key and the user device identifier, wherein the determining is based on a configurable setting stored by a network node of the cellular network that indicates whether the application function to which the identifier associated with the certificate is assigned is authorized to receive the message comprising the application key and the user device identifier.

Embodiment 11

The method of embodiment 10, the method further comprising:

interacting with another network node to obtain the application key and a version of the user device identifier.

Embodiment 12

The method of any one of embodiments 10 to 11, wherein the determining, based on the identifier associated with the certificate, whether the application function is authorized to receive the message comprising the application key and the user device identifier comprises interacting with another network node to obtain, from the other network node, information indicating whether the application function is authorized to receive the message comprising the application key and the user device identifier.

Embodiment 13

The method of any one of embodiments 10 to 12, wherein the identifier that is assigned to the application function and that is associated with the certificate consists of or comprises a client identifier that was assigned to the application function by the cellular network.

Embodiment 14

The method of any one of embodiments 10 to 13, wherein the identifier that is assigned to the application function and that is associated with the certificate consists of or comprises the application function identifier.

Embodiment 15

The method of any one of embodiments 10 to 14, wherein the identifier that is assigned to the application function and associated with the certificate is determined based on the certificate.

Embodiment 16

The method of any one of embodiments 10 to 15, wherein the certificate is associated with the identifier assigned to the application function by means of a token from an authorization server, wherein the request for the application key from the application function further comprises the token, and wherein the identifier that is assigned to the application function and associated with the certificate is determined based on the token.

Embodiment 17

The method of any one of embodiments 10 to 16, wherein the network node comprises a network exposure function, is the network exposure function, or is comprised in the network exposure function; and wherein the application function is external to the cellular network.

Embodiment 18

The method of any one of embodiments 10 to 17, wherein the network node comprises an authentication and key management for applications anchor function, is the authentication and key management for applications anchor function, or is comprised in the authentication and key management for applications anchor function; and wherein the application function is internal to the cellular network.

Embodiment 19

A method, e.g. performed by a network node, e.g. operating as at least part of a function in a cellular network, the method comprising:

storing or retrieving a configurable setting, the configurable setting indicating whether an application function to which an identifier associated with a certificate is assigned is authorized to receive a message comprising an application key and a user device identifier in response to a request for an application key, the request comprising a key identifier relating to a user device and an application function identifier; and interacting with another network node of a cellular network to provide, to the other network node, based on the configurable setting, information indicating whether the application function is authorized to receive the message comprising the application key and the user device identifier.

Embodiment 20

The method of embodiment 19, wherein the configurable setting is configurable by a subscriber of the cellular network.

Embodiment 21

The method of any one of embodiments 19 or 20, wherein the identifier that is assigned to the application function and that is associated with the certificate consists of or comprises a client identifier that was assigned to the application function by the cellular network.

Embodiment 22

The method of any one of embodiments 19 to 21, wherein the identifier that is assigned to the application function and that is associated with the certificate consists of or comprises the application function identifier.

Embodiment 23

The method of any one of embodiments 19 to 22, wherein the network node comprises a network function, is the network function, or is comprised in the network function.

Embodiment 24

The method of embodiment 23, wherein the network function is unified data management, or wherein the network function is authentication and key management for applications anchor function.

Embodiment 25

A method, e.g. performed by an apparatus for a user device, the method comprising:

transmitting, to an application function, an application session establishment request comprising a key identifier relating to a user device;

receiving, from the application function, an application session establishment response, wherein the application session establishment response is based on at least one response to a request from the application function to a network node of a cellular network for an application key, wherein the at least one response is from a set of possible responses comprising at least a rejection and a message comprising the application key and a user device identifier, and wherein the at least one response depends at least partly on a certificate used by the application function;

wherein the method further comprises at least one of option A or B, wherein according to option A, the certificate is assigned to the application function by the cellular network in a process of registering the application function with the cellular network, and the at least one response depends at least partly on the certificate in that the at least one response depends at least partly on an authentication of the application function based on the certificate; or wherein according to option B, the certificate is associated with an identifier assigned to the application function, and wherein the at least one response depends at least partly on the certificate in that the at least one response depends at least partly on a configurable setting stored by a network node of the cellular network, the configurable setting indicating whether the application function to which the identifier associated with the certificate is assigned is authorized to receive the message comprising the application key and the user device identifier.

Embodiment 26

The method of embodiment 25, the method further comprising:

obtaining information from the cellular network indicating one or more application functions for which a respective configurable setting stored by a network node of the cellular network indicates that the respective application function to which the identifier associated with the certificate is assigned is authorized to receive the message comprising the application key and the user device identifier.

Embodiment 27

The method of any one of embodiments 25 or 26, wherein the apparatus is part of a network different from the cellular network, the network comprising the apparatus and comprising at least one further apparatus without the capability to connect to the cellular network, and wherein the method further comprises:

operating as a gateway to the cellular network for the at least one further apparatus without the capability to connect to the cellular network.

Embodiment 28

The method of any one of embodiments 25 to 27, wherein the apparatus comprises the user device, is the user device or is comprised in the user device.

Embodiment 29

The method of any one of embodiments 25 to 28, wherein the user device is a user equipment.

Embodiment 30

An apparatus comprising respective means for performing the method of any one of embodiments 1 to 9.

Embodiment 31

An apparatus comprising at least one processor and at least one memory storing instructions that, when executed by the at least one processor, cause an apparatus at least to perform and/or control the method according any one of embodiments 1 to 9.

Embodiment 32

An apparatus comprising respective means for performing the method of any one of embodiments 10 to 18.

Embodiment 33

An apparatus comprising at least one processor and at least one memory storing instructions that, when executed by the at least one processor, cause an apparatus at least to perform and/or control the method according any one of embodiments 10 to 18.

Embodiment 34

An apparatus comprising respective means for performing the method of any one of embodiments 19 to 24.

Embodiment 35

An apparatus comprising at least one processor and at least one memory storing instructions that, when executed by the at least one processor, cause an apparatus at least to perform and/or control the method according any one of embodiments 19 to 24.

Embodiment 36

An apparatus comprising respective means for performing the method of any one of embodiments 25 to 29.

Embodiment 37

An apparatus comprising at least one processor and at least one memory storing instructions that, when executed by the at least one processor, cause an apparatus at least to perform and/or control the method according any one of embodiments 25 to 29.

Embodiment 38

A computer program, the computer program when executed by a processor causing an apparatus, e.g. the apparatus according to any of embodiments 30 to 37, to perform and/or control the actions and/or steps of the method of any of embodiments 1 to 29.

Embodiment 39

A computer program product comprising a computer program according to embodiment 38.

Embodiment 40

A system comprising:

at least an apparatus according to any one of embodiments 30 or 31; and further comprising at least one of:

an apparatus according to any one of embodiments 32 or 33;

an apparatus according to any one of embodiments 34 or 35; or an apparatus according to any one of embodiments 36 or 37.

Embodiment 41

A system comprising:

at least an apparatus according to any one of embodiments 32 or 33; and further comprising at least one of:

an apparatus according to any one of embodiments 30 or 31;

an apparatus according to any one of embodiments 34 or 35; or an apparatus according to any one of embodiments 36 or 37.

Embodiment 42

A system comprising:

at least an apparatus according to any one of embodiments 34 or 35; and further comprising at least one of:

an apparatus according to any one of embodiments 30 or 31;

an apparatus according to any one of embodiments 32 or 33; or an apparatus according to any one of embodiments 36 or 37.

Embodiment 43

A system comprising:

at least an apparatus according to any one of embodiments 36 or 37; and further comprising at least one of:

an apparatus according to any one of embodiments 30 or 31;

an apparatus according to any one of embodiments 32 or 33; or an apparatus according to any one of embodiments 34 or 35.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Having the same meaning as the expression "A and/or B", the expression "at least one of A or B" may be used herein. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above, e.g., in flowcharts or signaling diagrams, is not mandatory, also alternative sequences may be possible. Nevertheless, the specific sequence of method steps exemplarily shown in the figures shall be considered as one possible sequence of method steps for the respective embodiment described by the respective figure.

Steps of the sequences of method steps may happen in response to, under the condition of or after other steps, e.g., a step may be performed in response to, under the condition that or after the previous step in the sequence has been performed.

Even though several sequences of method steps have been presented in the flowcharts or signaling diagrams above, one or more of the method steps of a sequence may be performed without the others. In other words, one or more method steps may be omitted from the sequences presented above.

The subject-matter has been described above by means of example embodiments. It should be noted that there are alternative ways and variations which are obvious to a skilled person in the art and can be implemented without deviating from the scope of the appended claims.

The invention claimed is:

1. An apparatus for an application function comprising at least one processor; and at least one memory storing instructions that, when executed by the at least one processor, cause the apparatus at least to:

register with a cellular network and receive a certificate as part of the registering, wherein the certificate is associated with an identifier consisting of or comprising a client identifier assigned to the application function by the cellular network in the process of registering, wherein the identifier is based on the certificate;

receive, from a user device, an application session establishment request comprising a key identifier relating to the user device;

establish an encrypted session with a network node of the cellular network based on the certificate;

transmit a request for an application key to the network node using the encrypted session, wherein the request comprises the key identifier relating to the user device and an application function identifier;

receive at least one response to the request for the application key, wherein the at least one response is from a set of possible responses comprising at least a rejection and a message comprising the application key and a user device identifier, and wherein the at least one response depends at least partly on the certificate, wherein the at least one response depends at least partly on the certificate in that the at least one response depends at least partly on a configurable setting stored by a network node of the cellular network, the configurable setting indicating whether the application function to which the identifier associated with the certificate is assigned is authorized to receive the message comprising the application key and the user device identifier; and transmit, to the user device, an application session establishment response, wherein the application session establishment response is based on the received at least one response.

2. The apparatus of claim 1, wherein the identifier that is assigned to the application function and that is associated with the certificate consists of or comprises the application function identifier.

3. The apparatus of claim 1, wherein the network node to which the request for the application key is transmitted operates as at least part of a network exposure function of the cellular network, and wherein the application function is external to the cellular network.

4. The apparatus of claim 1, wherein the network node to which the request for the application key is transmitted operates as at least part of an authentication and key management for applications anchor function of the cellular network, and wherein the application function is internal to the cellular network.

5. The apparatus of claim 1, wherein the certificate is associated with the identifier assigned to the application function by means of a token, wherein the request for the application key to the network node further comprises the token, and wherein the token forms a basis for the network node to determine the identifier that is assigned to the application function and associated with the certificate, and wherein the at least one memory and the instructions are further configured to, with the at least one processor, cause the apparatus at least to:

request the token from an authorization server based on the certificate; and receive the token from the authorization server.

6. The apparatus of claim 1, wherein the at least one memory and the instructions are further configured to, with the at least one processor, cause the apparatus at least to:

operate as at least part of an authentication, authorization and accounting server for a network different from the cellular network, the network comprising the user device and comprising at least one apparatus without the capability to connect to the cellular network.

7. The apparatus of claim 1, wherein the apparatus comprises the application function, is the application function, or is comprised in the application function.

8. A network node comprising at least one processor; and at least one memory storing instructions that, when executed by the at least one processor, cause the network node at least to:

store or retrieve a configurable setting, the configurable setting indicating whether an application function to which an identifier associated with a certificate is assigned in a process of registering the application function with a cellular network is authorized to receive a message comprising an application key and a user device identifier in response to a request for an application key, the request comprising a key identifier relating to a user device and an application function identifier; and interact with another network node of the cellular network to provide, to the other network node, based on the configurable setting, information indicating whether the application function is authorized to receive the message comprising the application key and the user device identifier.

9. The network node of claim 8 wherein the configurable setting is configurable by a subscriber of the cellular network.

10. The network node of claim 8, wherein the identifier that is assigned to the application function and that is associated with the certificate consists of or comprises a client identifier that was assigned to the application function by the cellular network.

11. The network node of claim 8, wherein the identifier that is assigned to the application function and that is associated with the certificate consists of or comprises the application function identifier.

12. The network node of claim 8, wherein the network node comprises a network function, is the network function, or is comprised in the network function.

13. The network node of claim 12, wherein the network function is unified data management, or wherein the network function is authentication and key management for applications anchor function.

14. An apparatus for a user device comprising at least one processor; and at least one memory storing instructions that, when executed by the at least one processor, cause the user device at least to:

transmit, to an application function an application session establishment request comprising a key identifier relating to the user device; and receive, from the application function, an application session establishment response, wherein the application session establishment response is based on at least one response to a request from the application function to a network node of a cellular network for an application key, wherein the at least one response is from a set of possible responses comprising at least a rejection and a message comprising the application key and a user device identifier, and wherein the at least one response depends at least partly on a certificate used by the application function, wherein the at least one response depends at least partly on the certificate in that the at least one response depends at least partly on a configurable setting stored by a network node of the cellular network, the configurable setting indicating whether the application function to which the identifier associated with the certificate is assigned is authorized to receive the message comprising the application key and the user device identifier.

15. The apparatus of claim 14, wherein the at least one memory and the instructions are further configured to, with the at least one processor, cause the apparatus at least to:

obtain information from the cellular network indicating one or more application functions for which a respective configurable setting stored by a network node of the cellular network indicates that the respective application function to which the identifier associated with the certificate is assigned is authorized to receive the message comprising the application key and the user device identifier.

16. The apparatus of claim 14, wherein the apparatus is part of a network different from the cellular network, the network comprising the apparatus and comprising at least one further apparatus without the capability to connect to the cellular network, and wherein the at least one memory and the instructions are further configured to, with the at least one processor, cause the apparatus to perform:

operating as a gateway to the cellular network for the at least one further apparatus without the capability to connect to the cellular network.

17. The apparatus of claim 14, wherein the apparatus comprises the user device, is the user device or is comprised in the user device.

18. The apparatus of claim 14, wherein the user device is a user equipment.

* * * * *